(12) United States Patent
Wakamatsu

(10) Patent No.: US 10,484,608 B2
(45) Date of Patent: Nov. 19, 2019

(54) IMAGE STABILIZATION APPARATUS, CONTROL METHOD THEREOF, AND STORAGE MEDIUM

(71) Applicant: CANON KABUSHIKI KAISHA, Tokyo (JP)

(72) Inventor: Nobushige Wakamatsu, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 15/962,031

(22) Filed: Apr. 25, 2018

(65) Prior Publication Data
US 2018/0316865 A1 Nov. 1, 2018

(30) Foreign Application Priority Data
Apr. 28, 2017 (JP) ................... 2017-090238

(51) Int. Cl.
*H04N 5/232* (2006.01)

(52) U.S. Cl.
CPC ......... *H04N 5/23287* (2013.01); *H04N 5/232* (2013.01); *H04N 5/2329* (2013.01); *H04N 5/23212* (2013.01); *H04N 5/23258* (2013.01)

(58) Field of Classification Search
CPC ............... H04N 5/23287; H04N 5/232; H04N 5/23258; H04N 5/2329; H04N 5/23212
See application file for complete search history.

(56) References Cited

U.S. PATENT DOCUMENTS

| 9,124,807 B2* | 9/2015 | Tsubaki | H04N 5/2329 |
| 2006/0140602 A1* | 6/2006 | Kurata | H04N 5/23248 |
| | | | 396/55 |
| 2010/0245604 A1* | 9/2010 | Ohmiya | G03B 5/00 |
| | | | 348/208.99 |
| 2011/0019016 A1* | 1/2011 | Saito | G06T 5/003 |
| | | | 348/208.6 |
| 2014/0063276 A1* | 3/2014 | Tsuchida | H04N 5/23267 |
| | | | 348/208.6 |
| 2014/0063279 A1* | 3/2014 | Ogura | H04N 5/23209 |
| | | | 348/222.1 |

(Continued)

FOREIGN PATENT DOCUMENTS

| JP | 2006-186481 A | 7/2006 |
| JP | 2011-029735 A | 2/2011 |

*Primary Examiner* — Shahbaz Nazrul
(74) *Attorney, Agent, or Firm* — Cowan, Liebowitz & Latman, P.C.

(57) ABSTRACT

An image stabilization apparatus including a supporting unit that supports an image capturing unit, a rotation unit that rotates the supporting unit, a calculation unit that calculates a residual correction amount of image blur after image blur correction is performed by a first image blur correction unit, a second image blur correction unit that corrects the residual correction amount of image blur using a method different from that of the first image blur correction unit, and a change unit that changes allocation between a correctable range of the second image blur correction unit correcting image blur in a horizontal or vertical direction on the imaging plane and a correctable range of the second image blur correction unit, based on a rotation angle of the rotation unit and the residual correction amount of image blur.

12 Claims, 19 Drawing Sheets

(56) References Cited

U.S. PATENT DOCUMENTS

| | | | |
|---|---|---|---|
| 2014/0078327 A1* | 3/2014 | Miyasako | H04N 5/23258 348/208.6 |
| 2014/0111661 A1* | 4/2014 | Watanabe | G06T 5/003 348/208.6 |
| 2014/0300765 A1* | 10/2014 | Takao | H04N 5/23254 348/208.1 |
| 2015/0123990 A1* | 5/2015 | Satoh | H04N 5/23248 345/625 |
| 2016/0223327 A1* | 8/2016 | Norman | G02B 27/644 |
| 2016/0255273 A1* | 9/2016 | Wakamatsu | H04N 5/23248 348/208.99 |
| 2017/0078577 A1* | 3/2017 | Wakamatsu | H04N 5/23287 |
| 2018/0308241 A1* | 10/2018 | Johnston | G06T 7/248 |

* cited by examiner

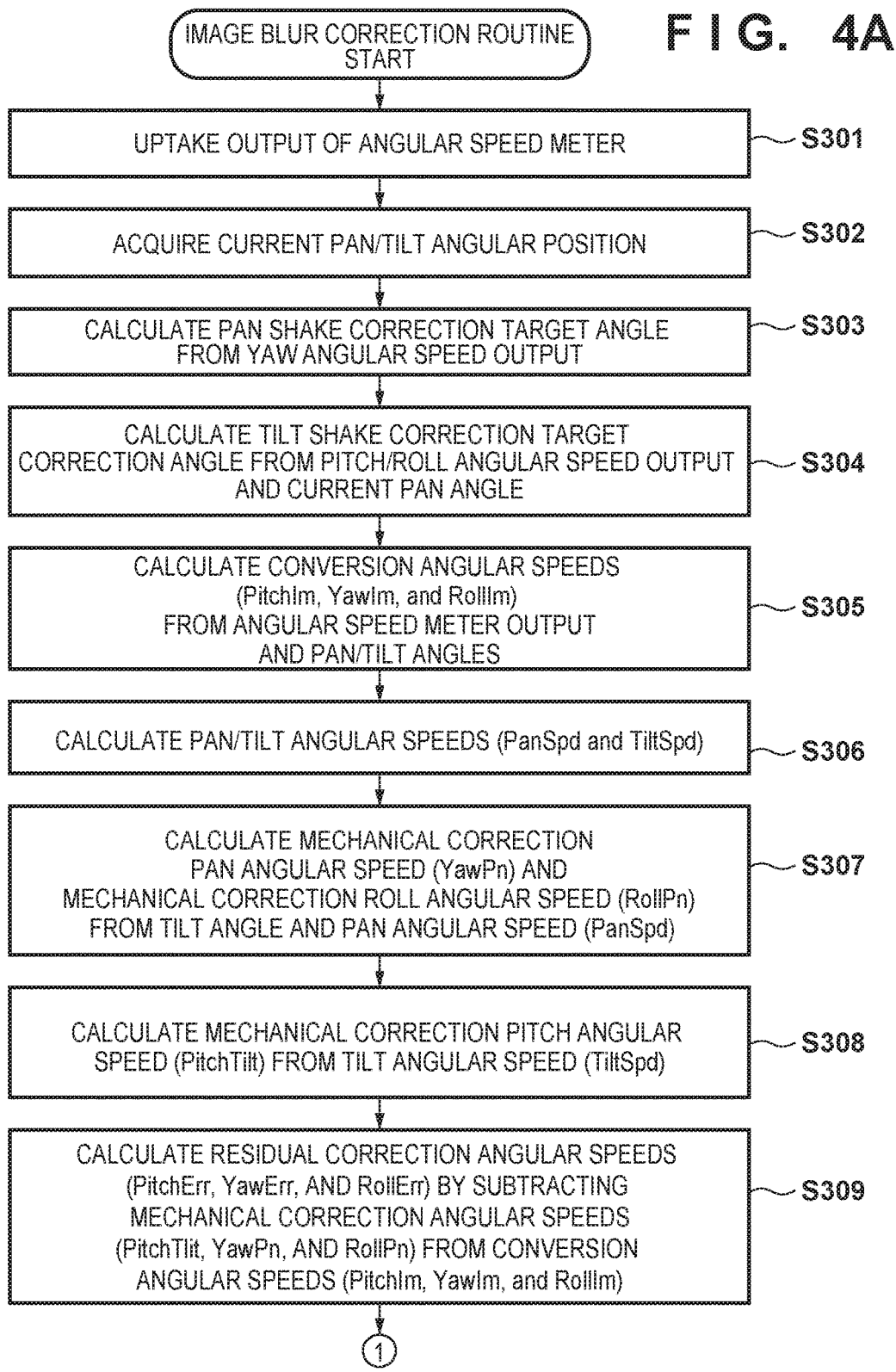

F I G. 7A
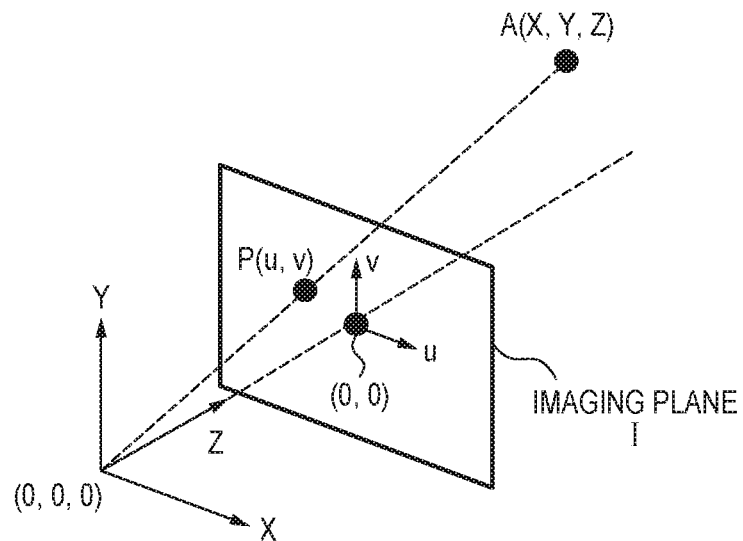
F I G. 7B
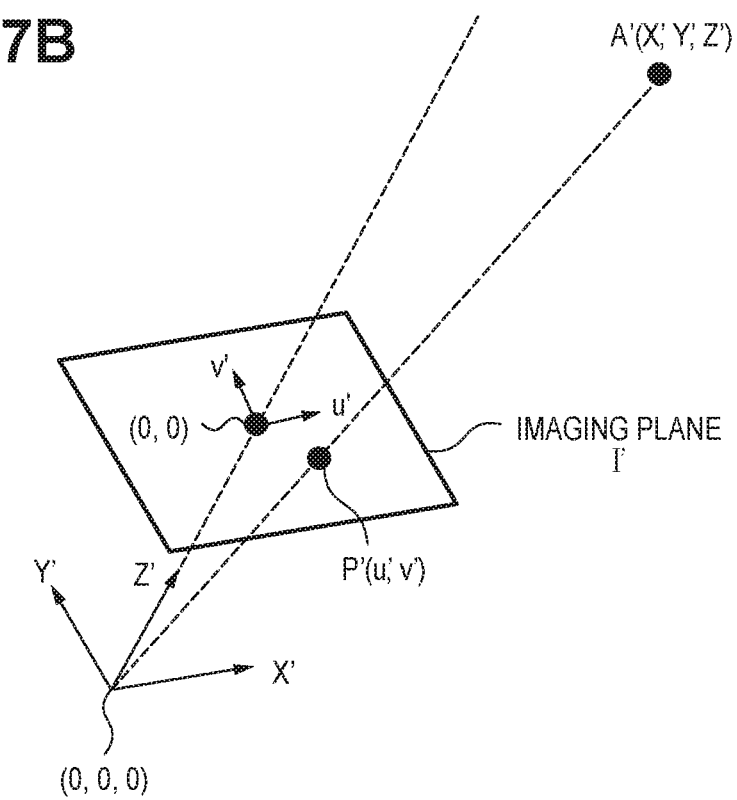

F I G. 9A
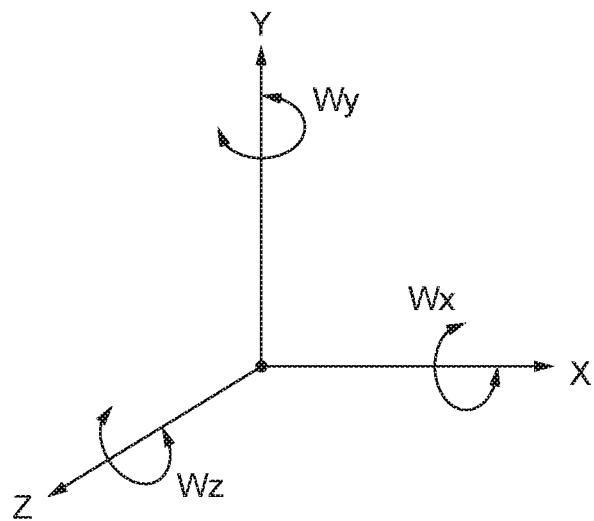
F I G. 9B
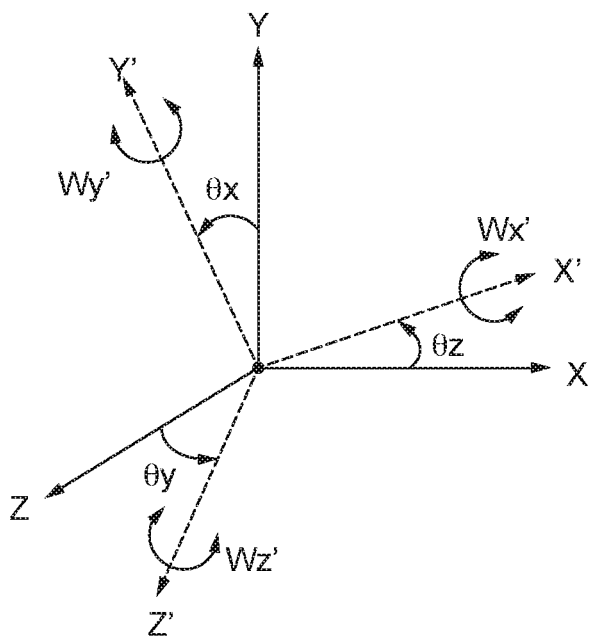

IMAGE STABILIZATION APPARATUS, CONTROL METHOD THEREOF, AND STORAGE MEDIUM

BACKGROUND OF THE INVENTION

Field of the Invention

The present invention relates to a technique for correcting image blur of an image caused by shake of an apparatus.

Description of the Related Art

Conventionally, the following methods are known as those of an image stabilization apparatus mounted in an image capturing apparatus. As one such method, there is a method for suppressing image blur of an image on an imaging plane by moving a lens or an image sensor on a plane perpendicular to the optical axis in accordance with a camera shake amount. There is also a method for correcting image blur caused by roll rotation, by rotating the image sensor about the optical axis. Furthermore, there is also a method for rotationally driving a barrel including a shooting optical system and an image sensor so as to eliminate rotating shake of the camera, and correcting image blur.

In addition, in moving image shooting, there is a method for correcting, through electronic correction, various types of image blur that occur in shot frame images that are output by an image sensor. For example, Japanese Patent Laid-Open No. 2011-029735 discloses a method for calculating an image deformation amount of a shot image, and deforming the image so as to eliminate the image deformation amount.

Furthermore, Patent Literature 2 discloses, regarding correction of rolling shutter distortion, a technique for correcting distortion caused by a shake of the hand of a photographer. In the apparatus described in Japanese Patent Laid-Open No. 2006-186481 (Patent Literature 2), a readout position is changed for each of the lines of the image sensor in order to correct camera shake in the horizontal direction, and the position of a line to be read out is changed in the vertical direction in order to correct camera shake in the vertical direction.

Incidentally, there is a method for correcting image blur using an image blur correction mechanism in which a mechanism for rotationally driving an entire image capturing unit including an imaging optical system that forms an object image and an image sensor that captures an object image that has passed through the imaging optical system is incorporated in a portion of an image capturing apparatus, an external platform or an electric stabilizer.

In the case of such an image blur correction mechanism that adopts rotational driving, rotational driving units for three axes are desirably included, and if driving for three axes is possible, a high image blur correction effect can be achieved. However, on the other hand, there are the problems of an increase in the size of the apparatus, an increase in power consumption, and the like. Here, in the case where object search through composition change or the like is performed, roll rotational driving about the optical axis is not necessarily required, and there are also cases where it suffices that panning and tilting driving of a large amount is possible. In that case, roll rotational driving is not performed, and by adopting a mechanical configuration in which rotational driving about only two axes, namely panning and tilting driving, is possible, it is possible to prevent an increase in the size of the apparatus and an increase in power consumption.

However, in the case of an image stabilization apparatus that has a two-axis rotation mechanism only, there is an issue in that, although rotating shake in two axis directions can be corrected, image blur correction for the remaining one axis cannot be performed.

For example, as in FIG. 2A, a case is considered in which the direction of the optical axis of a barrel matches a Z axis, namely a roll rotation axis in FIG. 2B. In this case, image blur correction in the horizontal direction on the imaging plane can be performed by driving a pan rotation unit 105, but image blur correction in a rotation direction on the imaging plane cannot be performed. In addition, as in FIG. 2C, in the case where the direction of the optical axis of a barrel matches a Y axis, namely a yaw rotation axis in FIG. 2B, image blur correction in a rotation direction on the imaging plane can be performed by driving the pan rotation unit 105, but image blur correction in the horizontal direction on the imaging plane cannot be performed.

SUMMARY OF THE INVENTION

The present invention has been made in view of the above issues, and makes it possible to achieve a high image blur correction effect in an apparatus that has a two-axis rotation mechanism only, regarding an axis about which rotation cannot be performed.

According to a first aspect of the present invention, there is provided an image stabilization apparatus comprising: a supporting unit configured to support an image capturing unit configured to capture an object image formed by an imaging optical system a rotation unit configured to rotate the supporting unit in two axis directions: a calculation unit configured to calculate a residual correction amount of image blur after image blur correction is performed by a first image blur correction unit configured to correct image blur on an imaging plane of the image capturing unit caused by shake of the apparatus by driving the rotation unit, based on output of a shake detection unit configured to detect shake of the apparatus and a moving amount of the first image blur correction unit; a second image blur correction unit configured to correct the residual correction amount of image blur using a method different from that of the first image blur correction unit: and a change unit configured to change allocation between a correctable range of the second image blur correction unit correcting image blur in a horizontal or vertical direction on the imaging plane of the image capturing unit and a correctable range of the second image blur correction unit correcting image blur in a rotation direction on the imaging plane, based on a rotation angle of the rotation unit and the residual correction amount of image blur.

According to a second aspect of the present invention, there is provided a control method of an image stabilization apparatus that includes a supporting unit that supports an image capturing unit that captures an object image formed by an imaging optical system, and a rotation unit that rotates the supporting unit in two axis directions, said method comprising: calculating a residual correction amount of image blur after image blur correction is performed by a first image blur correction unit that corrects image blur on an imaging plane of the image capturing unit caused by shake of the apparatus by driving the rotation unit, based on output of a shake detection unit that detects shake of the apparatus and a moving amount of the first image blur correction unit:

correcting the residual correction amount of image blur, by a second image blur correction unit that corrects the residual correction amount of image blur using a method different from that of the first image blur correction unit: and changing allocation between a correctable range of the second image blur correction unit correcting image blur in a horizontal or vertical direction on the imaging plane of the image capturing unit and a correctable range of the second image blur correction unit correcting image blur in a rotation direction on the imaging plane, based on a rotation angle of the rotation unit and the residual correction amount of image blur.

According to a third aspect of the present invention, there is provided a computer-readable storage medium that stores a program for causing a computer to execute steps of a control method of an image stabilization apparatus that includes a supporting unit that supports an image capturing unit that captures an object image formed by an imaging optical system, and a rotation unit that rotates the supporting unit in two axis directions, said method comprising: calculating a residual correction amount of image blur after image blur correction is performed by a first image blur correction unit that corrects image blur on an imaging plane of the image capturing unit caused by shake of the apparatus by driving the rotation unit, based on output of a shake detection unit that detects shake of the apparatus and a moving amount of the first image blur correction unit: correcting the residual correction amount of image blur, by a second image blur correction unit that corrects the residual correction amount of image blur using a method different from that of the first image blur correction unit; and changing allocation between a correctable range of the second image blur correction unit correcting image blur in a horizontal or vertical direction on the imaging plane of the image capturing unit and a correctable range of the second image blur correction unit correcting image blur in a rotation direction on the imaging plane, based on a rotation angle of the rotation unit and the residual correction amount of image blur.

Further features of the present invention will become apparent from the following description of exemplary embodiments with reference to the attached drawings.

BRIEF DESCRIPTION OF THE DRAWINGS

FIGS. 4A and 4B are flowcharts showing shake correction processing in the first embodiment.

FIGS. 7A and 7B are diagrams for explaining a pinhole camera model.

FIGS. 9A and 9B are explanatory diagrams of rotation axis conversion in the first embodiment.

DESCRIPTION OF THE EMBODIMENTS

Embodiments of the present invention will be described below in detail with reference to the accompanying drawings. Here, definition of image blur in the embodiments of the present invention will be described. Vibration that is applied to an image capturing apparatus is referred to as "shake", and deformation of a captured image caused by shake applied to an image capturing apparatus is referred to as "image blur". Specifically, in the embodiments of the present invention, as shown in FIGS. 1A to 1F, deformation components such as (horizontal and vertical) translation, rotation, (horizontal and vertical) elevation, enlargement/reduction, and shearing are collectively referred to as "image blur".

First Embodiment

Figure 1A:
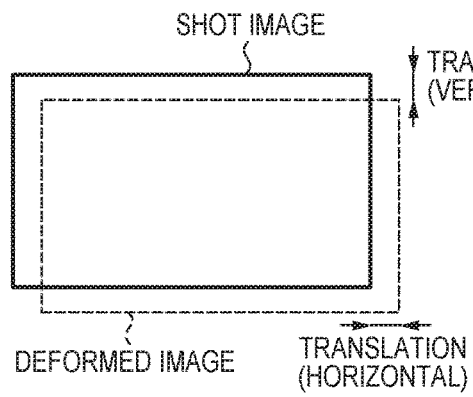
FIGS. 1A to 1F are diagrams for explaining the definition of image blur in an embodiment of the present invention.
Figure 1B:
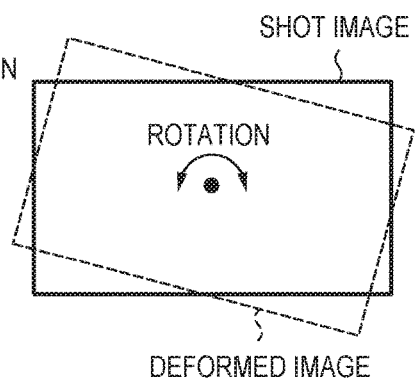
Figure 1C:
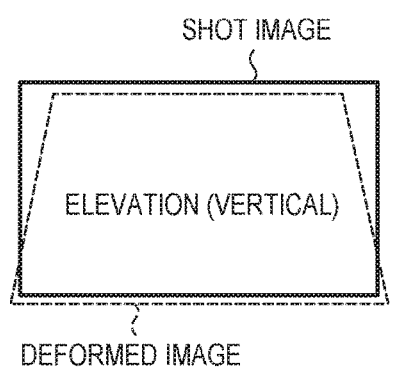
Figure 1D:
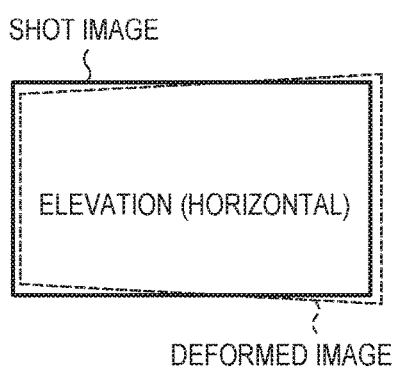
Figure 1E:
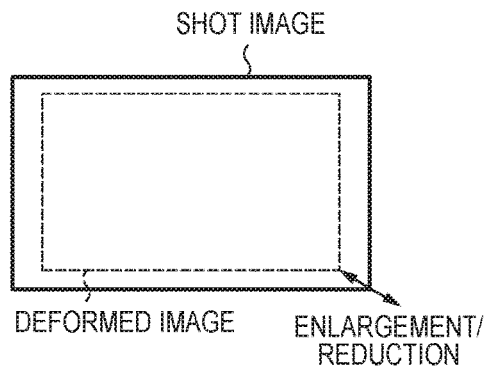
Figure 1F:
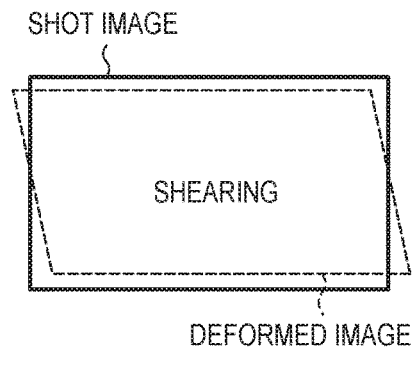
Figure 2A:
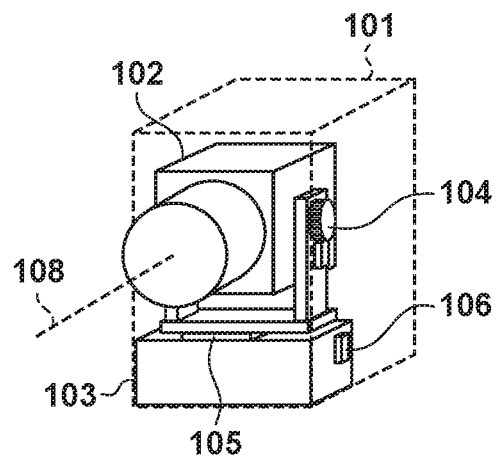
FIGS. 2A to 2D are diagrams schematically showing a camera according to an embodiment.

FIGS. 2A to 2D are diagrams schematically showing a camera 101 as a first embodiment of an image capturing apparatus of the present invention. The camera 101 shown in FIG. 2A is provided with a power switch, operation members that can perform camera operations, and the like. A barrel 102 that integrally includes a shooting lens group as an imaging optical system that performs image capturing and an image sensor is attached to the camera 101. Furthermore, the camera 101 has a mechanism that makes it possible to rotationally drive (rotate) the barrel 102 relative to a fixing unit (main body unit) 103.

Figure 2B:
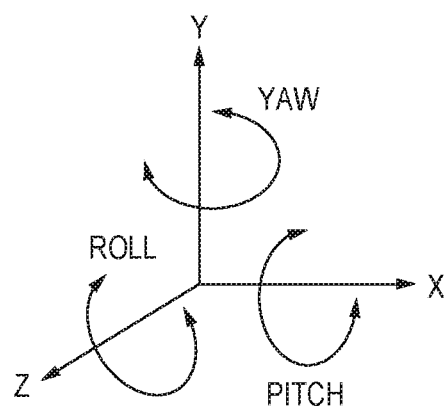
Figure 2C:
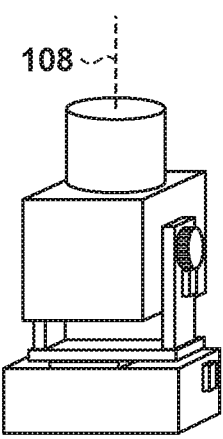
Figure 2D:
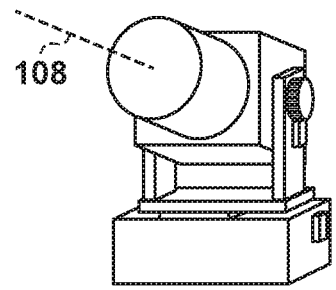

A tilt rotation unit 104 has a motor driving mechanism that can rotationally drive the barrel 102 in a pitch direction shown in FIG. 2B, and a pan rotation unit 105 has a motor driving mechanism that can rotationally drive the barrel 102 in a yaw direction shown in FIG. 2B. Accordingly, the camera 101 has a mechanism for rotationally driving the barrel 102 in two axis directions. The axes shown in FIG. 2B are defined relative to the position of the fixing unit 103. An angular speed meter 106 is implemented on the fixing unit 103 of the camera 101.

Figure 3:
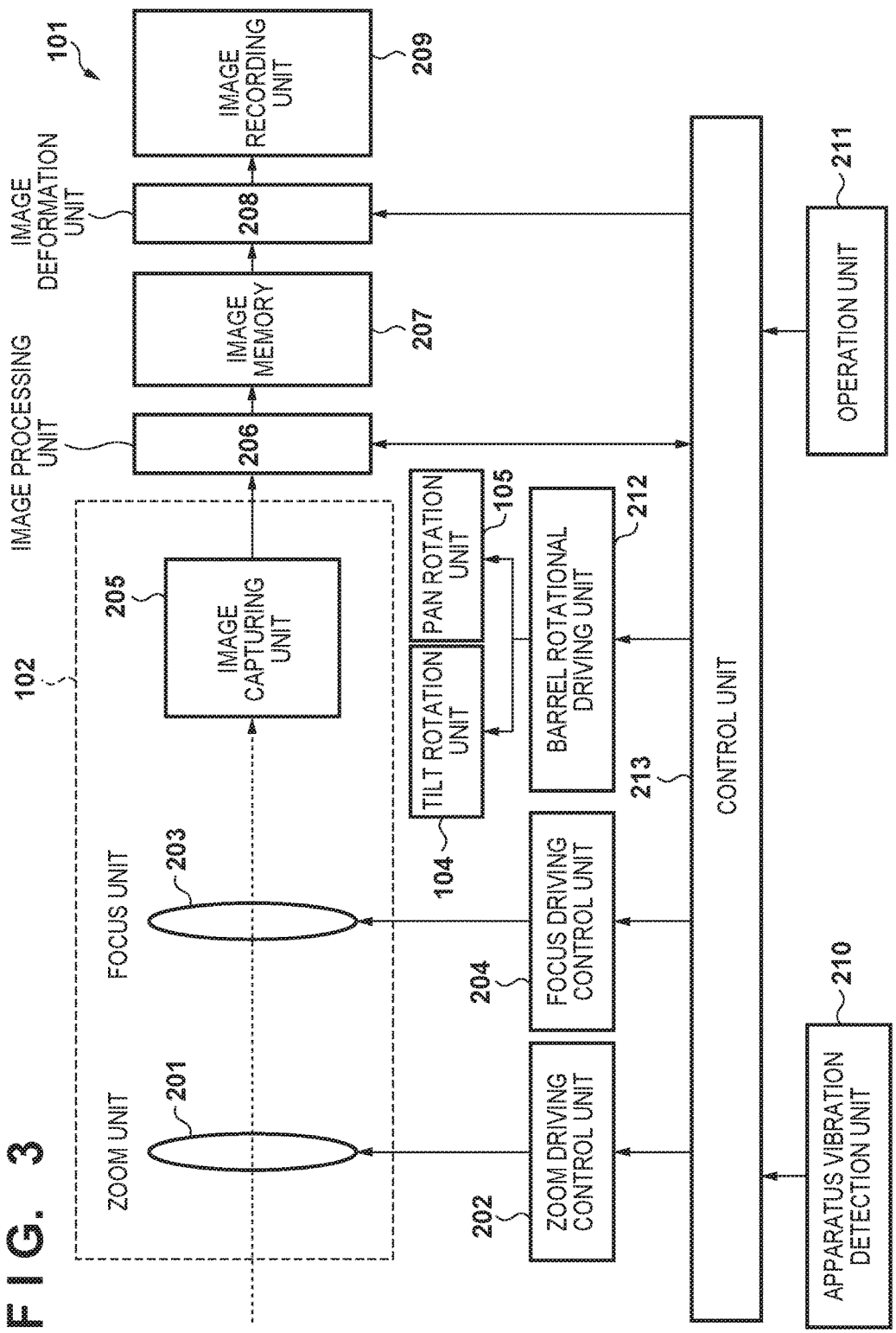
FIG. 3 is a diagram showing the configuration of a camera in a first embodiment.

FIG. 3 is a block diagram showing an overall configuration of the camera 101 of this embodiment. In FIG. 3, a zoom unit 201 includes a zoom lens that performs magnification. A zoom driving control unit 202 controls driving of the zoom unit 201, and detects the focal distance (focal distance detection) at this time. A focus unit 203 includes a lens that performs focus adjustment. A focus driving control unit 204 controls driving of the focus unit 203. An image capturing unit 205 has an image sensor, receives light that is incident through the lens group, and outputs information regarding electric charges that are based on the amount of the light, as analog image data to an image processing unit 206. Note that the zoom unit 201, the focus unit 203, and the image capturing unit 205 are arranged in the barrel 102.

The image processing unit 206 applies image processing such as distortion correction, white balance adjustment, and color interpolation processing to digital image data acquired by A/D converting analog image data, and outputs the digital image data acquired after applying the processing. The digital image data is further converted into video signals that comply with a format such as NTSC or PAL, and the video signals are supplied to an image memory 207. An image deformation unit 208 deforms the image signals stored in the image memory 207 based on an image deformation amount calculated by a control unit 213, and outputs the deformed image signals, which are recorded in a recording medium such as a nonvolatile memory by an image recording unit 209.

A barrel rotational driving unit 212 drives the tilt rotation unit 104 and the pan rotation unit 105 so as to rotate the barrel 102 in the tilt direction and pan direction. The angular speed meter (gyro sensor) 106 that detects angular speeds of the camera 101 in three axis directions is incorporated in an apparatus vibration detection unit 210, for example.

An operation unit 211 is an operation member provided for operating the system, and has a power button, buttons with which settings of the camera can be changed, and the like. When the power button is operated, power is supplied to the entire system according to the usage, and the camera 101 is started. The control unit 213 controls the entire camera 101.

Figure 4B:
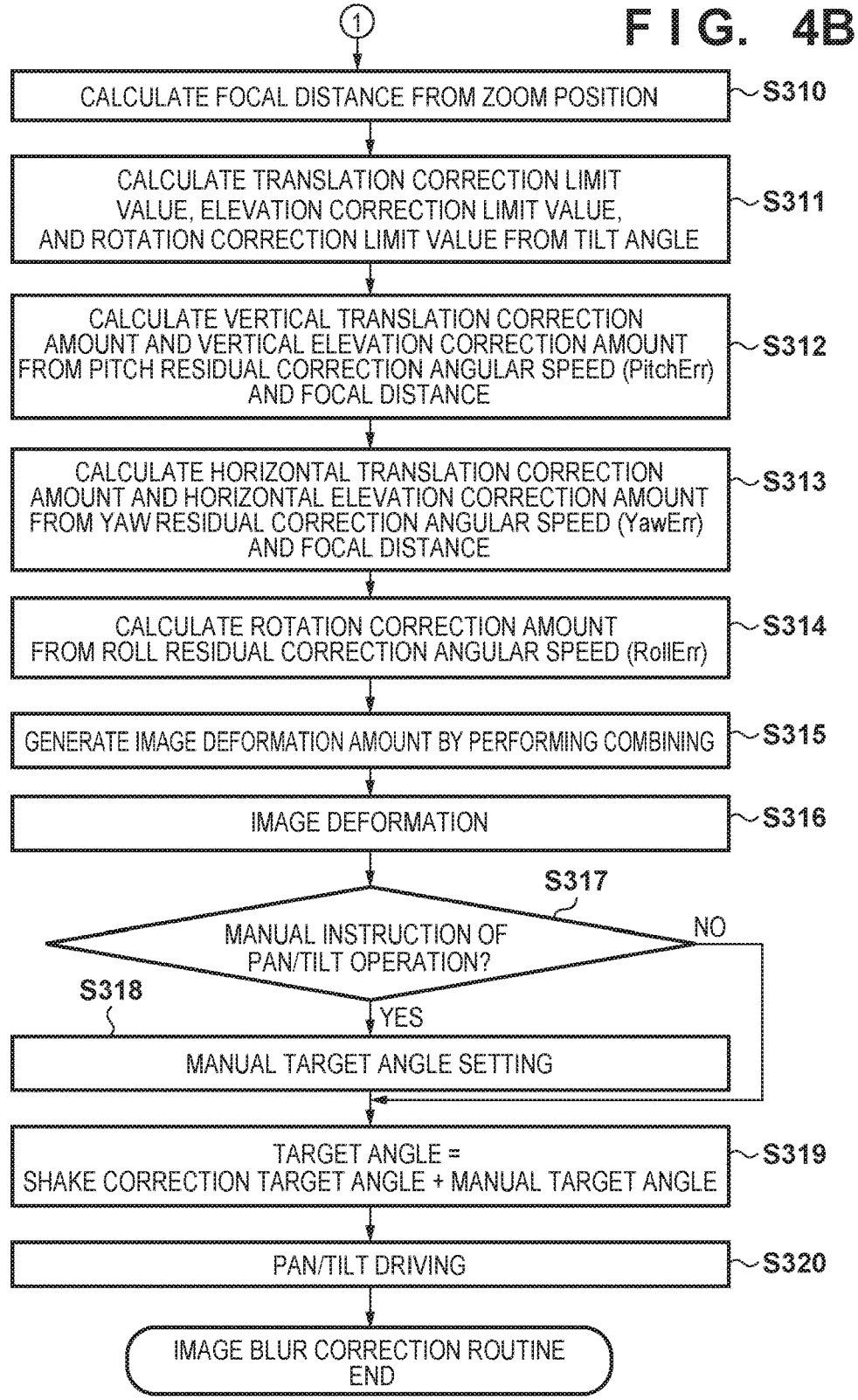

FIGS. 4A and 4B show a flowchart for describing a routine for correcting image blur caused by shake of the camera 101 of this embodiment. This flow starts when the power supply of the camera is turned on, and is repeated at a predetermined sampling frequency.

When the power button of the operation unit 211 is operated, angular speed output for three axes is first acquired, in step S301, from the angular speed meter 106 installed on the fixing unit 103, and the procedure advances to step S302.

In step S302, the barrel rotational driving unit 212 uptakes the current pan/tilt angular positions from output of the encoders that are respectively installed in the tilt rotation unit 104 and the pan rotation unit 105, and that can acquire a rotation angle, and the procedure advances to step S303.

Figure 5:
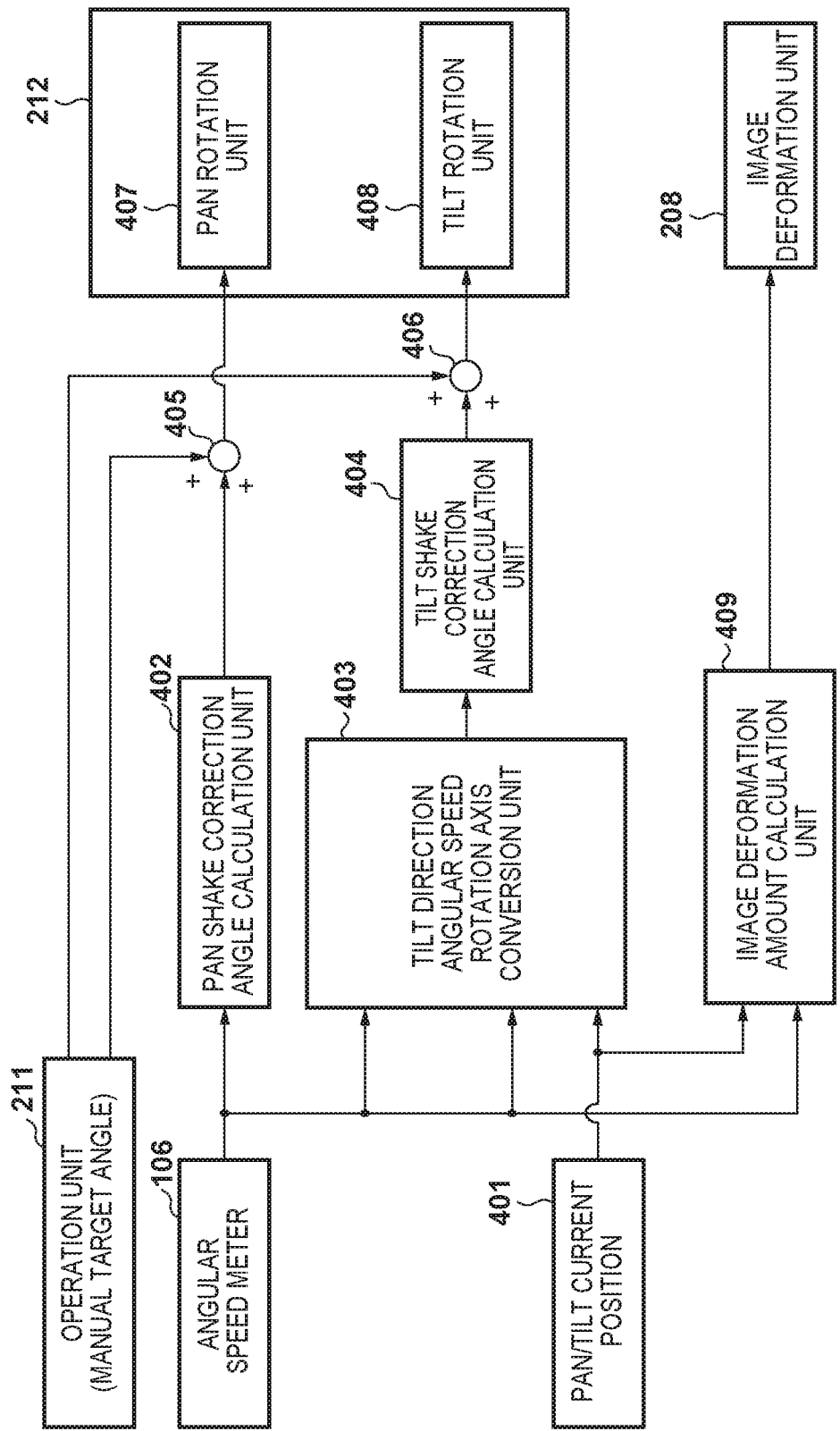
FIG. 5 is a block diagram a control unit of the first embodiment.

FIG. 5 is a diagram showing a block configuration for calculating pan tilt rotation correction amounts and an electronic image blur correction amount. The angular speed meter 106 is arranged on the camera fixing unit 103 as shown in FIG. 2A, and the rotation axis of the pan rotation unit 105 matches the rotation axis in the yaw direction of the angular speed meter 106. Thus, by removing low-frequency components of a yaw angular speed that is output from the angular speed meter 106, using an HPF (high pass filter), and then performing angle conversion through integration processing, a shake correction angle in the pan direction (yaw direction) can be calculated. Shake correction in the pan direction can then be performed by rotationally driving the pan rotation unit 105 based on the shake correction angle. Thus, in order to calculate a target angle of a pan rotation unit 407 of the barrel rotational driving unit 212, a shake correction target angle in the pan direction is calculated only from yaw angular speed output of the angular speed meter 106 in step S303, and the procedure advances to step S304.

In step S304, a shake correction target angle in the tilt direction is calculated from output of a pitch angular speed and a roll angular speed of the angular speed meter 106, and the current pan angle position information acquired in step S302. Regarding the tilt direction, the angular speed meter 106 is implemented on the camera fixing unit 103, and thus a correction amount for performing shake correction in the tilt direction changes according to the rotation angle of the pan rotation unit 105.

Figure 6A:
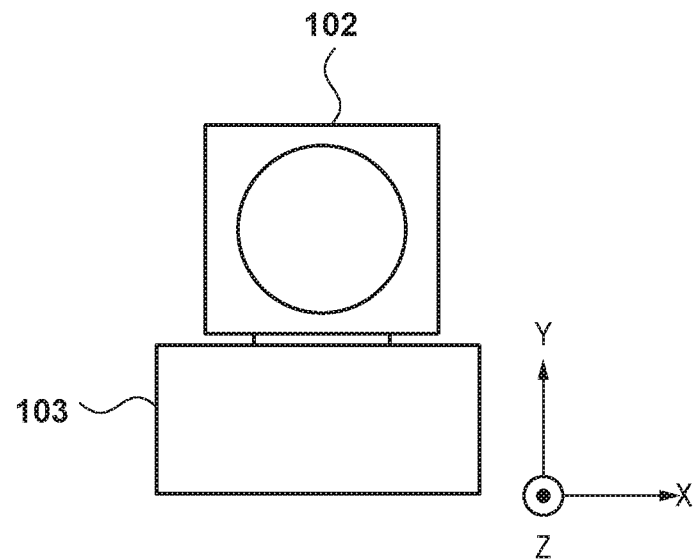
FIGS. 6A and 6B are diagrams for explaining the definitions of axes in the first embodiment.
Figure 6B:
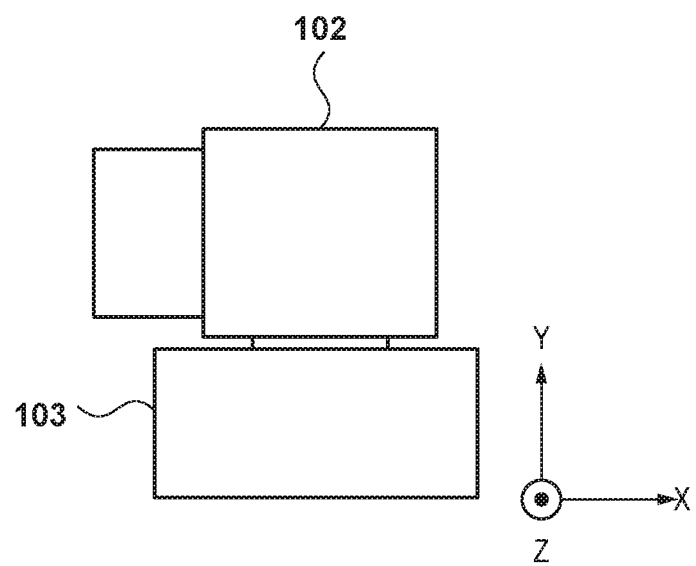

An angular speed in an axis direction defined as in FIG. 2B can be detected at the position of the angular speed meter 106, that is, the position of the camera fixing unit 103. In the case where pan rotation occurs at a positive position (when the X axis is always positioned to be perpendicular to the optical axis as shown in FIG. 6A), the axis of the tilt rotation unit that can perform shake correction in the tilt direction matches the pitch axis in FIG. 2B. Therefore, a tilt shake correction target angle is calculated only from pitch angular speed output. In addition, in the case where a pan rotation angle is 90 degrees from a positive position (when the Z axis is always positioned to be perpendicular to the optical axis as shown in FIG. 6B), the axis of the tilt rotation unit matches the roll axis in FIG. 2B, and thus a tilt shake correction target angle is calculated only from roll angular speed output. In the case where the pan rotation angle is positioned at an angle between those axes, the pitch angular speed and the roll angular speed are combined based on the pan rotation angle, rotation direction conversion into the axis of the tilt rotation unit 104 is performed, and an angular speed in the tilt direction is calculated.

An equation of a tilt direction angular speed rotation axis conversion unit 403 in FIG. 5 is expressed as Expression 1.

$$Wtl = Wx \cdot \cos\theta y + Wz \cdot \sin\theta y \quad (1)$$

(Wtl: tilt direction angular speed,
Wx: pitch shake correction angle,
Wz: roll shake correction angle, and
θy: pan rotation angle relative to positive position)

Using the tilt direction angular speed calculated as described above, a tilt shake correction angle calculation unit 404 calculates a tilt shake correction target angle for a tilt rotation unit 408 to drive the tilt rotation unit 104 so as to perform shake correction. By removing low-frequency components from the tilt direction angular speed Wtl using an HPF, and then converting the result into an angle through integration processing, a shake correction target angle in the tilt direction can be calculated.

In step S304, a tilt direction shake correction target angle is calculated from the pitch angular speed and the roll angular speed from the angular speed meter 106 and the current pan angle from the pan rotation unit 105 using the following method, and the procedure advances to step S305.

In steps S305 to S315, processing for calculating an image deformation amount is performed in order to perform electronic shake correction through image deformation, but a method for calculating an image deformation amount of a captured image, and then deforming the image so as to eliminate the image deformation amount will be described first.

The image deformation unit 208 performs image deformation using geometric conversion such as projection conversion, for example. Specifically, when pixel coordinates in an image before being deformed are (X0,Y0) (note that the center of the captured image corresponding to the optical axis of the imaging optical system is set as the origin), and pixel coordinates in the deformed image are (X1,Y1), if expressed in homogenous coordinates, image deformation can be described as Expression 2.

$$\begin{bmatrix} X1 \\ Y1 \\ 1 \end{bmatrix} \sim \begin{bmatrix} h1 & h2 & h3 \\ h4 & h5 & h6 \\ h7 & h8 & 1 \end{bmatrix} \begin{bmatrix} X0 \\ Y0 \\ 1 \end{bmatrix} \quad (2)$$

The left side and the right side of Expression 2 have an equivalent relation (when the left side or the right side is multiplied by any multiplying factor, the meaning does not change), and if a normal equal sign is used, Expression 2 is expressed as Expression 3 or 4

$$X1 = \frac{h1X0 + h2Y0 + h3}{h7X0 + h8Y0 + 1} \quad (3)$$

$$Y1 = \frac{h4X0 + h5Y0 + h6}{h7X0 + h8Y0 + 1} \quad (4)$$

In Expression 2, the matrix of 3×3 is generally called a projection conversion matrix, and matrix elements h1 to h8 are set by an image deformation amount calculation unit 409. Note that, in the following description, image deformation is performed using projection conversion, but any deformation method such as affine transformation may be used.

Next, processing that is performed by the image deformation amount calculation unit 409 will be described in detail. The image deformation amount calculation unit 409 calculates an image deformation amount using a residual shake angle on the imaging plane and the focal distance of the imaging optical system. Specifically, the projection conversion matrix in Expression 2 is calculated.

Here, a method for calculating a projection conversion matrix using the residual shake angle and the focal distance of the imaging optical system will be described below. FIG. 7A illustrates, as a pinhole camera model, projection of an object on an imaging plane performed by an image capturing apparatus. In FIG. 7A, the origin (0,0,0) of XYZ space coordinates is at a pinhole position in the pinhole camera model. If the imaging plane is arranged behind the pinhole position, an image projected on the imaging plane is inverted, and thus FIG. 7A illustrates the imaging plane I being virtually positioned in front of the pinhole position such that the image is not inverted and is easy to handle.

The distance in the Z axis direction between the origin (0,0,0) of the XYZ space coordinate and the imaging plane I is equivalent to a focal distance f. Coordinates on the imaging plane I are defined as uv plane coordinates, and the origin (0,0) of the uv plane coordinates matches (0,0,f) on the XYZ space coordinates. Coordinates P (u,v) on the uv plane coordinates are the coordinates of an object A (X,Y,Z) on the XYZ space coordinates when projected on the imaging plane I. At this time, the coordinates P can be expressed as Expression 5.

$$\begin{bmatrix} u \\ v \end{bmatrix} = \begin{bmatrix} f\frac{X}{Y} \\ f\frac{Y}{Z} \end{bmatrix} \quad (5)$$

Expression 5 can be expressed as Expression 6 if homogenous coordinates are used.

$$\begin{bmatrix} u \\ v \\ 1 \end{bmatrix} \sim \begin{bmatrix} f & 0 & 0 & 0 \\ 0 & f & 0 & 0 \\ 0 & 0 & 1 & 0 \end{bmatrix} \begin{bmatrix} X \\ Y \\ Z \\ 1 \end{bmatrix} \quad (6)$$

The elements in the fourth column of the matrix of 3×4 in Expression 6 are 0 in this embodiment, and thus changing Expression 6 to Expression 7 does not make any difference.

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} \begin{bmatrix} X \\ Y \\ Z \end{bmatrix} \quad (7)$$

FIG. 7B is a diagram showing a state where the pinhole camera model in FIG. 7A is R-rotated. In FIG. 7B, coordinates acquired by R-rotating the XYZ space coordinates in FIG. 7A are referred to as X'Y'Z' space coordinates. The origin (0,0,0) of the X'Y'Z' space coordinates matches the origin (0,0,0) of the XYZ space coordinates. Specifically, FIG. 7B illustrates, in a simplified manner as a pinhole camera model, a state where R-rotation shake in a third direction, namely the direction of the shooting optical axis has occurred on the image capturing apparatus, and parallel shake that is a parallel movement of the image capturing apparatus has not occurred.

In the pinhole camera model in FIG. 7B, an imaging plane I' is arranged at a position to be distanced from the origin (0,0,0) by the focal distance f, similar to FIG. 7A. Coordinates on the imaging plane I' are defined as u'v' plane coordinates, and the origin (0,0) of the u'v' plane coordinates matches (0,0,f) in the X'Y'Z' space coordinates. Coordinates P'(u',v') on the u'v' plane coordinates are coordinates of an object A'(X',Y',Z') on the X'Y'Z' space coordinates when projected on the imaging plane I'. Note that the positions of the object A in FIG. 7A and the object A' in FIG. 7B in a world coordinate system are the same (which means that the object has not moved). At this time, the coordinates P' can be expressed as Expression 8 if homogenous coordinates are used, similar to Expression 7.

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} \begin{bmatrix} X' \\ Y' \\ Z' \end{bmatrix} \quad (8)$$

In addition, the positions of the object A and the object A' in the world coordinate system are the same, and thus the relationship of the coordinates of those objects can be expressed as Expression 9.

$$\begin{bmatrix} X' \\ Y' \\ Z' \end{bmatrix} = R \begin{bmatrix} X \\ Y \\ Z \end{bmatrix} \quad (9)$$

Furthermore, if Expressions 7 and 8 are transformed and substituted in Expression 9, Expression 10 can be derived.

$$\begin{bmatrix} u' \\ v' \\ 1 \end{bmatrix} \sim \begin{bmatrix} f & 0 & 0 \\ 0 & f & 0 \\ 0 & 0 & 1 \end{bmatrix} R \begin{bmatrix} f & 0 & 0 \\ 0 & f & 0 \\ 0 & 0 & 1 \end{bmatrix}^{-1} \begin{bmatrix} u \\ v \\ 1 \end{bmatrix} \quad (10)$$

Expression 10 expresses a correspondence relationship of the position of an object image on an imaging plane before and after R rotation of a pinhole camera. Specifically, this expression shows a start point and an end point of movement of a pixel on an image captured when R-rotation shake is applied to the image capturing apparatus. Thus, it suffices to perform conversion for returning a pixel movement amount when shake is applied to the image capturing apparatus to its original value in order to correct an image blur amount. Accordingly, in accordance with Expression 11, rotation opposite to R-rotation is applied to the image capturing apparatus.

$$\begin{bmatrix} u \\ v \\ 1 \end{bmatrix} \sim \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \begin{bmatrix} u' \\ v' \\ 1 \end{bmatrix} \quad (11)$$

Thus, when shake that is applied to the image capturing apparatus is R, the focal distance of the imaging optical system is f, and a projection conversion matrix for performing image blur correction is H, H is expressed as Expression 12.

$$H = \begin{bmatrix} f & 0 & 0 \\ 0 & f & 0 \\ 0 & 0 & 1 \end{bmatrix} R^{-1} \begin{bmatrix} f & 0 & 0 \\ 0 & f & 0 \\ 0 & 0 & 1 \end{bmatrix}^{-1} \quad (12)$$

Note that, when an angular shake amount in the YAW direction, of shake in a first direction on a plane perpendicular to the optical axis, the shake having been applied to the image capturing apparatus, is θy, and the angular shake amount in the PITCH direction, of shake in a second direction orthogonal to the first direction on a plane perpendicular to the optical axis is θp, and an angular shake amount in the ROLL direction is θr, R can be expressed as Expression 13.

$$R = \begin{bmatrix} \cos\theta y & 0 & -\sin\theta y \\ 0 & 1 & 0 \\ \sin\theta y & 0 & \cos\theta y \end{bmatrix} \begin{bmatrix} 1 & 0 & 0 \\ 0 & \cos\theta p & -\sin\theta p \\ 0 & \sin\theta p & \cos\theta p \end{bmatrix} \begin{bmatrix} \cos\theta r & -\sin\theta r & 0 \\ \sin\theta r & \cos\theta r & 0 \\ 0 & 0 & 1 \end{bmatrix} \quad (13)$$

H in Expression 12 can be broken down into deformation components such as translation $\vec{t}$ the enlargement/reduction s (constant), rotation r (matrix), shearing k (matrix), and elevation $\vec{v}$, using Expression 14.

$$H = \begin{bmatrix} sr & \vec{t} \\ \vec{O'} & 1 \end{bmatrix} \begin{bmatrix} k & \vec{O} \\ \vec{O'} & 1 \end{bmatrix} \begin{bmatrix} I & \vec{O} \\ \vec{v'} & 1 \end{bmatrix} \quad (14)$$

$$r = \begin{bmatrix} \cos\theta & -\sin\theta \\ \sin\theta & \cos\theta \end{bmatrix}, \vec{t} = \begin{bmatrix} tx \\ ty \end{bmatrix},$$

-continued $$k = \begin{bmatrix} \alpha & \tan\varphi \\ 0 & 1 \end{bmatrix}, \vec{v} = \begin{bmatrix} vx \\ vy \end{bmatrix}, I = \begin{bmatrix} 1 & 0 \\ 0 & 1 \end{bmatrix}, \vec{O} = \begin{bmatrix} 0 \\ 0 \end{bmatrix}$$

Here,
tx is the horizontal translation amount,
ty is the vertical translation amount,
θ is the rotation angle,
vx is the horizontal elevation amount,
vy is the vertical elevation amount,
α is the anisotropic magnification of shearing, and
φ is the direction angle of shearing.

When equations regarding the respective deformation components are solved using Expressions 12, 13, and 14, Expressions 15 to 22 are acquired.

$$tx = f(\tan\theta y \cos\theta r/\cos\theta p + \tan\theta p \sin\theta r) \quad (15)$$

$$ty = f(-\tan\theta y \sin\theta r/\cos\theta p + \tan\theta p \cos\theta r) \quad (16)$$

$$\theta = -\theta r \quad (17)$$

$$vx = -\tan\theta y/f \quad (18)$$

$$vy = -\tan\theta p/(f \cos\theta y) \quad (19)$$

$$s = (\cos\theta y \cos\theta p)^{-3/2} \quad (20)$$

$$\alpha = (\cos\theta p \cos\theta y)^{1/2} \quad (21)$$

$$\tan\varphi = \sin\theta y \sin p/(\cos\theta y \cos\theta p)^{1/2} \quad (22)$$

Here, when a shake angle that is applied to the image capturing apparatus is γ, and this value is not high, it is possible to approximate cos γ=1, sin γ tan γ=0, and sin γ sin γ=0, and Expressions 15 to 22 can be expressed as Expressions 23 to 30.

$$tx = f \tan\theta y \quad (23)$$

$$ty = f \tan\theta p \quad (24)$$

$$\theta = -\theta r \quad (25)$$

$$vx = -\tan\theta y/f \quad (26)$$

$$vy = -\tan\theta p/f \quad (27)$$

$$s = 1 \quad (28)$$

$$\alpha = 1 \quad (29)$$

$$\tan\varphi = 0 \quad (30)$$

The configuration and operations of the image deformation amount calculation unit 409 in this embodiment will be described specifically below with reference to FIGS. 8 to 13.

In this embodiment, shearing and enlargement/reduction components from among deformation components of image deformation that is performed by the image deformation unit 208 are not illustrated. However, a configuration may be adopted in which image deformation regarding shearing and enlargement/reduction components is performed in accordance with Expressions 20 to 22 or Expressions 28 to 30.

First, in step S305 in FIG. 4A, an angular speed is calculated by performing rotation conversion on the output of angular speeds of three axes acquired from the angular speed meter 106 attached to the fixing unit 103, the rotation conversion being performed about axes relative to the barrel including the image sensor.

Axes relative to the camera fixing unit 103 are defined as in FIG. 9A. An angular speed in the rotation direction about the X axis (pitch) is Wx, an angular speed in the rotation direction about the Y axis (yaw) is Wy, and an angular speed in the rotation direction about the Z axis (roll) is Wz. In addition, axes relative to the barrel 102 that is a camera rotation unit are defined as X', Y', Z' as in FIG. 9B, and an angular speed in the rotation direction about the X' axis is Wx', an angular speed in the rotation direction about the Y' axis is Wy', and an angular speed in the rotation direction about the Z' axis is Wz'. In addition, an angle acquired by inclining the Y axis toward the Z axis is θx, an angle acquired by inclining the Z axis toward the X axis is θy, and an angle acquired by inclining the X axis toward the Y axis is θz.

θx, θy, and θz are each the angles of the difference between the fixing unit 103 and the rotation unit (barrel) 102, but the rotation unit 102 can be driven only along two axes, namely, in the tilt direction and the pan direction, and thus the direction θz excluding the other two axes is always 0.

Here, a rotation matrix about the X axis, the Y axis, and the Z axis in a three-dimensional space can be expressed as Expressions 31 to 33 below.

$$Rx(\theta) = \begin{bmatrix} 1 & 0 & 0 \\ 0 & \cos\theta & -\sin\theta \\ 0 & \sin\theta & \cos\theta \end{bmatrix} \quad (31)$$

$$Ry(\theta) = \begin{bmatrix} \cos\theta & 0 & \sin\theta \\ 0 & 1 & 0 \\ -\sin\theta & 0 & \cos\theta \end{bmatrix} \quad (32)$$

$$Rz(\theta) = \begin{bmatrix} \cos\theta & -\sin\theta & 0 \\ \sin\theta & \cos\theta & 0 \\ 0 & 0 & 1 \end{bmatrix} \quad (33)$$

Figure 8:
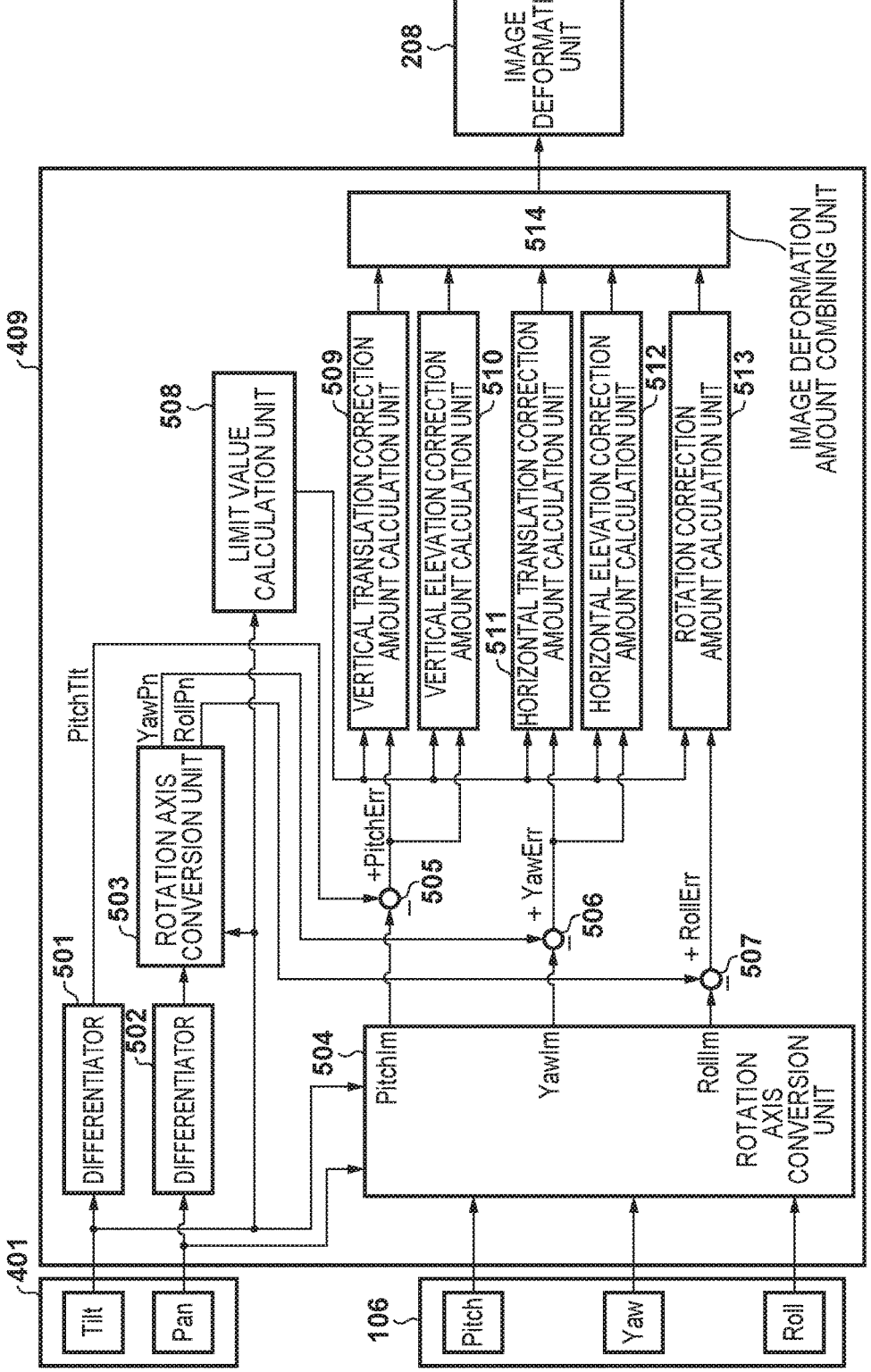
FIG. 8 is a block diagram of an image deformation amount calculation unit in the first embodiment.

In a rotation axis conversion unit 504 in FIG. 8, output of the angular speed meter 106 arranged on the fixing unit 103 is converted into an angular speed according to the definition of axes based on the imaging plane, taking the rotation angle of the barrel into consideration. The rotation angular speed Wx about the X axis, the rotation angular speed Wy about the Y axis, and the rotation angular speed Wz about the Z axis can be detected by the angular speed meter.

Expression 36 is used to convert an angular speed W (Expression 34) of the fixing unit 103 into an angular speed W' (Expression 35) of the barrel that has been rotated.

$$W = \begin{bmatrix} Wx \\ Wy \\ Wz \end{bmatrix} \quad (34)$$

$$W' = \begin{bmatrix} Wx' \\ Wy' \\ Wz' \end{bmatrix} \quad (35)$$

$$W' = Rx(\theta x)Ry(\theta y)W \quad (36)$$

By using the above-described method, angular speeds of the three axes detected at the fixing unit 103 can be converted into angular speeds of the three axes (PitchIm, YawIm. and RollIm) of the barrel (rotation unit) 102, using pan and tilt angles.

Next, in step S306 in FIG. 4A, a tilt angular speed (TiltSpd) is calculated by a differentiator 501 differentiating a tilt angle acquired from a pan/tilt current position 401. In addition, a pan angular speed (PanSpd) is similarly calculated by a differentiator 502 differentiating a pan angle. The procedure then advances to step S307.

In step S307, a rotation axis conversion unit 503 converts the pan angular speed (PanSpd) into a mechanical correction angular speed along an axis of the barrel (rotation unit) 102, using a tilt angle. Specifically, a pan angular speed Wpa (PanSpd) acquired by differentiating a pan angle is converted into a Yaw angular speed Wya (YawPn) and a Roll angular speed Wrl (RollPn) according to the definition of axes based on the imaging plane, taking a tilt angle θtl into consideration. At this time, the tilt rotation axis matches the pitch rotation axis on the imaging plane, and thus the pitch rotation axis may be ignored, and Expression 37 is acquired.

$$\begin{bmatrix} Wya \\ Wrl \end{bmatrix} = \begin{bmatrix} \cos\theta tl & -\sin\theta tl \\ \sin\theta tl & \cos\theta tl \end{bmatrix} \begin{bmatrix} Wpa \\ 0 \end{bmatrix} \quad (37)$$

Next, in step S308, a driving angular speed (PitchTlt) of the tilt rotation unit 104 is calculated. At this time, driving in the tilt direction is not affected in a direction on the imaging plane (always causes vertical shake), and thus the tilt angular speed (TiltSpd) is set without being changed, as a mechanical correction pitch angular speed (PitchTlt).

In step S309, mechanical residual correction angular speeds (PitchErr, YawErr, and RollErr) are respectively calculated by subtractors 505, 506, and 507 subtracting mechanical correction angular speeds (PitchTlt, YawPn, and RollPn) from angular speeds (PitchIm, YawIm, and RollIm) that have been converted into rotation axes of the barrel 102.

In step S310, a focal distance is calculated from the zoom position of the imaging optical system, and the procedure advances to step S311. In step S311, based on the current tilt angle from the pan/tilt current position 401, a limit value calculation unit 508 calculates correction limit values for the respective types of correction that are performed through image deformation.

Here, the limit value calculation unit 508 will be described in detail. In order to electronically correct image blur through image deformation, extra pixels required for the deformation need to be secured for the size of an output image. Here, if a barrel that can be rotationally driven along two axes, namely in the pan direction and the tilt direction as shown in FIGS. 2A to 2D is included, with a focus on each of the shake components, vertical shake and vertical elevation in the image can be corrected before light is incident on the imaging plane, by driving the tilt rotation unit 104. Thus, a movable range (correctable range) of electronic image blur correction in the vertical direction does not need to be large.

However, in the case of driving the pan rotation unit 105 so as to perform shake correction, the influence of the correction on the shake on the imaging plane differs according to the tilt angle. For example, in the case where, as in FIG. 2A, the direction of the optical axis of the barrel matches the Z axis, namely the roll rotation axis in FIG. 2B, image blur correction in the horizontal direction (translation direction, of elevation) on the imaging plane is possible by driving the pan rotation unit 105. However, it is not possible to correct image blur in a rotation direction on the imaging plane. In addition, in the case where, as in FIG. 2C, the direction of the optical axis of the barrel matches the Y axis, namely the yaw rotation axis in FIG. 2B, it is possible to perform image blur correction in a rotation direction on the imaging plane by driving the pan unit. However, (translational or elevational) image blur in the horizontal direction on the imaging plane cannot be corrected.

Shake and elevation in the horizontal direction or rotation shake in an image change according to the angle of the tilt unit. From Expression 37, the Yaw angular speed Wya (YawPn) and the Roll angular speed Wrl (RollPn) acquired according to the definitions of axes that are based on the imaging plane are respectively expressed as Expression 38 and Expression 39.

$$Wya = Wpa \cdot \cos \theta tl \quad (38)$$

$$Wrl = Wpa \cdot \sin \theta tl \quad (39)$$

Figure 10A:
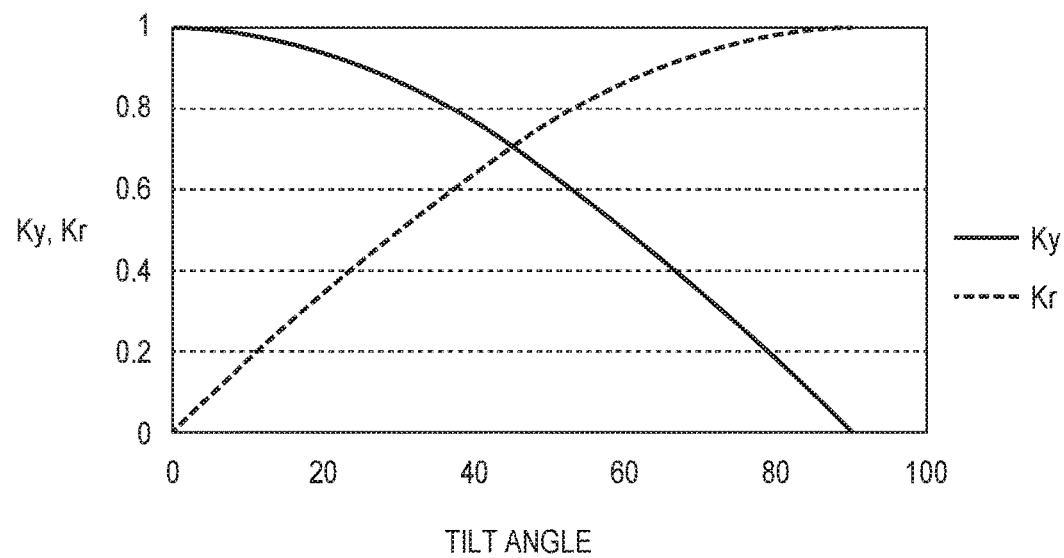
FIGS. 10A and 10B are diagrams showing change in a ratio of correction to change in a tilt angle in the first embodiment.

In addition, when Ky and Kr are respectively defined as in Expression 40 and Expression 41, a graph indicating changes in Ky and Kr relative to changes in the tilt angle θtl is as shown in FIG. 10A.

$$Ky = \cos \theta tl \quad (40)$$

$$Kr = \sin \theta tl \quad (41)$$

Figure 10B:
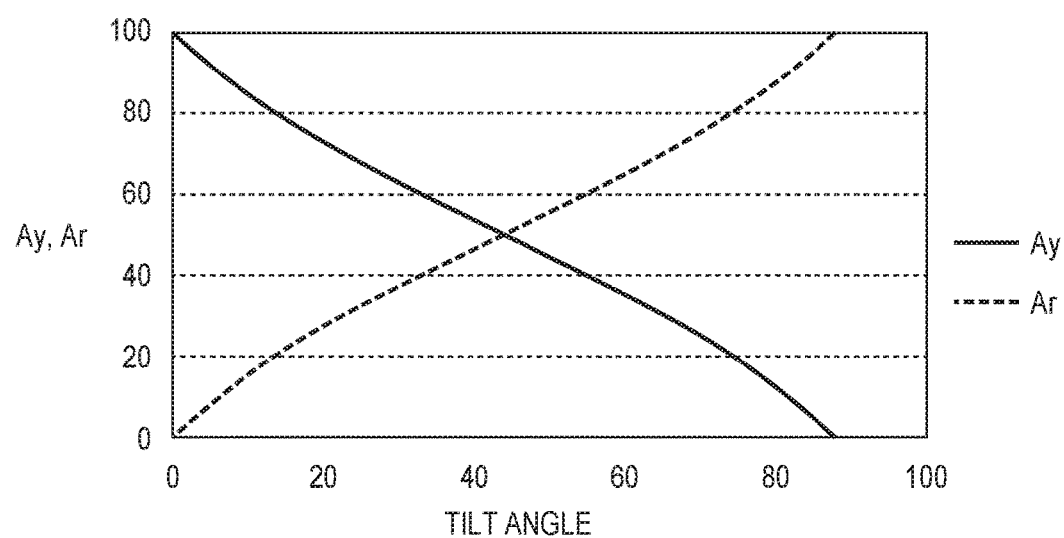

Thus, when the pan angular speed Wpa (PanSpd) is 100, the ratio (Ay,Ar) of the magnitude of Ky and Kr according to the tilt angle is as shown in FIG. 10B. Here, Wya indicates the influence of image blur (translation or elevation) in the horizontal direction on the imaging plane, and Wrl indicates the influence of image blur in a rotation direction on the imaging plane. Therefore, if the ratio of a correction limit value for electronic correction of translation and elevation to a correction limit value for electronic correction of rotation is set to the ratio in FIG. 10B according to the tilt angle, an appropriate correction amount can be secured for each type of shake.

For example, in the case where the optical axis direction of the barrel and the Z axis, namely the roll rotation axis in FIG. 2B, make a small angle (the tilt rotation angle is small) as in FIG. 2A, the correction limit value for electronic correction of rotation is set high, and the correction limit value for electronic correction of translation and elevation is set low. Accordingly, the shake correction effect of electronic correction in a rotation direction that cannot be mechanically corrected can be set high, and even in the case where a large shake occurs in a rotation direction, appropriate shake correction is possible. In addition, in the case where the optical axis direction of the barrel and the Y axis, namely the yaw rotation axis in FIG. 2B, make a small angle (the tilt rotation angle is large) as in FIG. 2C, the correction limit value for electronic correction of translation and elevation is set high, and the correction limit value for electronic correction of rotation is set low. Accordingly, the shake correction effect of electronic correction of translation and elevation in the horizontal direction that cannot be mechanically corrected can be set high, and even in the case where large shake occurs in the horizontal direction, appropriate shake correction is possible. A translation correction limit value, an elevation correction limit value, and a roll correction limit value are calculated from the tilt angle using the above-described method, and the procedure advances to step S312.

Figure 11:
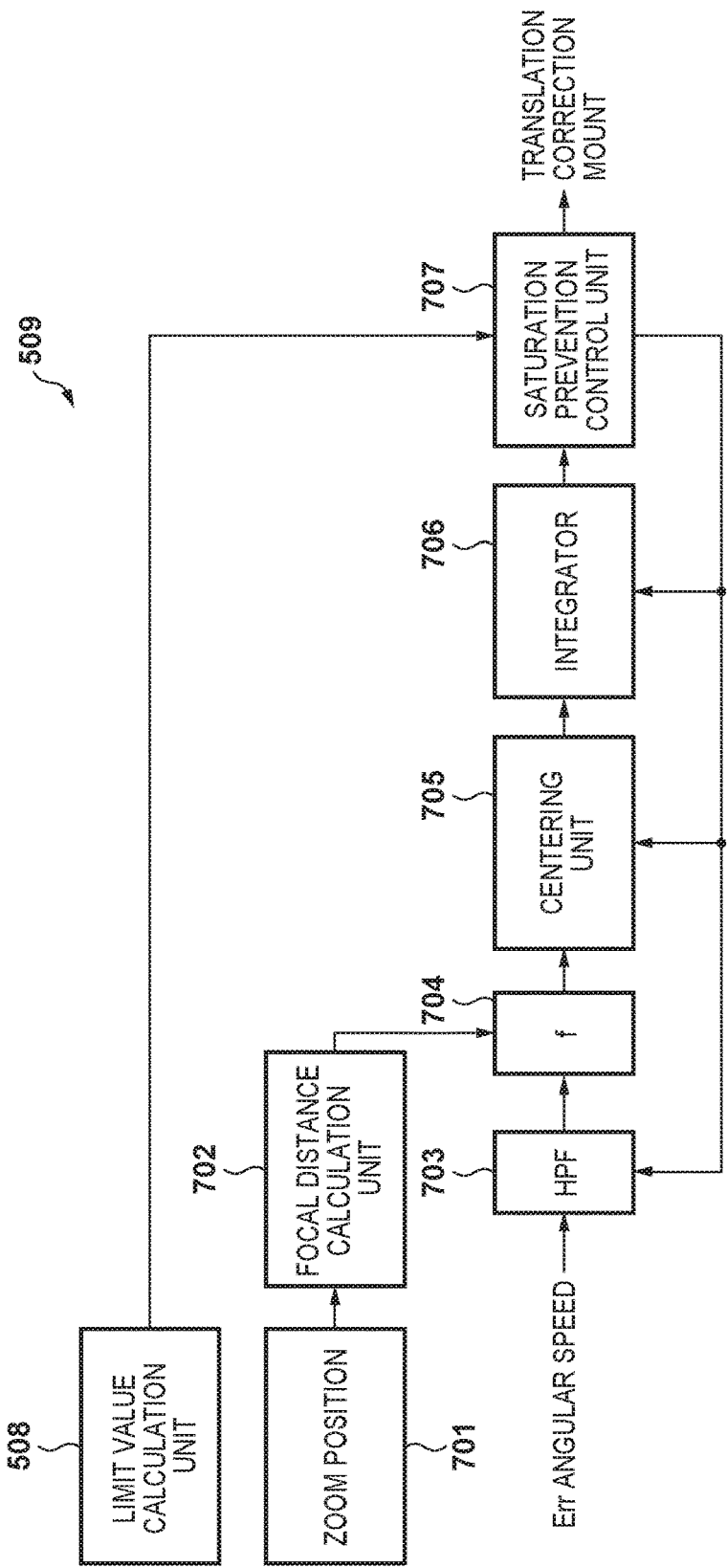
FIG. 11 is a block diagram of a translation correction amount calculation unit in the first embodiment.

In step S312, a vertical translation correction amount and a vertical elevation correction amount are calculated based on the pitch residual correction angular speed (PitchErr) and the focal distance. The vertical translation correction amount is calculated by a vertical translation correction amount calculation unit 509. FIG. 11 shows the internal block configuration of the vertical translation correction amount calculation unit 509. Operations of the internal blocks in FIG. 11 will be described.

Err angular speeds that are residual correction angular speeds are input to a high pass filter (hereinafter, an HPF) 703 that has a function of being able to change the characteristics at any frequency band, and low-frequency components included in the angular speed data are blocked and high-frequency-band signals are output. A focal distance calculation unit 702 calculates the focal distance of the imaging optical system from output of the encoder of the zoom unit 201, and sets the focal distance to be used for calculation that is performed by a focal distance multiplication unit 704. The focal distance multiplication unit 704 multiplies the output of the HPF 703 by the calculated focal distance f, and supplies the result to a centering unit 705. The centering unit 705 performs processing for adding, to the output of the focal distance multiplication unit 704, an input value (hereinafter, a centering amount) that reduces a correction amount when large angular shake that exceeds the correction range for translation correction occurs. An integrator 706 has a function of being able to change the characteristics at any frequency band, integrates output from the centering unit 705, and supplies the result to a saturation prevention control unit 707. As described above, the limit value calculation unit 508 calculates a limit value in accordance with the tilt angle position, and inputs the limit value to the saturation prevention control unit 707.

The saturation prevention control unit 707 performs control so as to limit the magnitude of output from the integrator 706 such that the output from the integrator 706 is not larger than or equal to a limit value that is output from the limit value calculation unit 508. In addition, when the magnitude of output from the integrator 706 approximates the limit value, the saturation prevention control unit 707 performs control so as to change the cutoff frequency of the HPF 703 to the high-frequency side, shorten a time constant of the integrator 706, increase the centering amount of the centering unit 705, and the like. Accordingly, the magnitude of output from the integrator 706 can be made unlikely to reach the limit value, and a final translation correction amount suitable for a correction region limited by the limit value calculation unit 508 can be calculated, and this translation correction amount is input to an image deformation amount combining unit 514.

Figure 12:
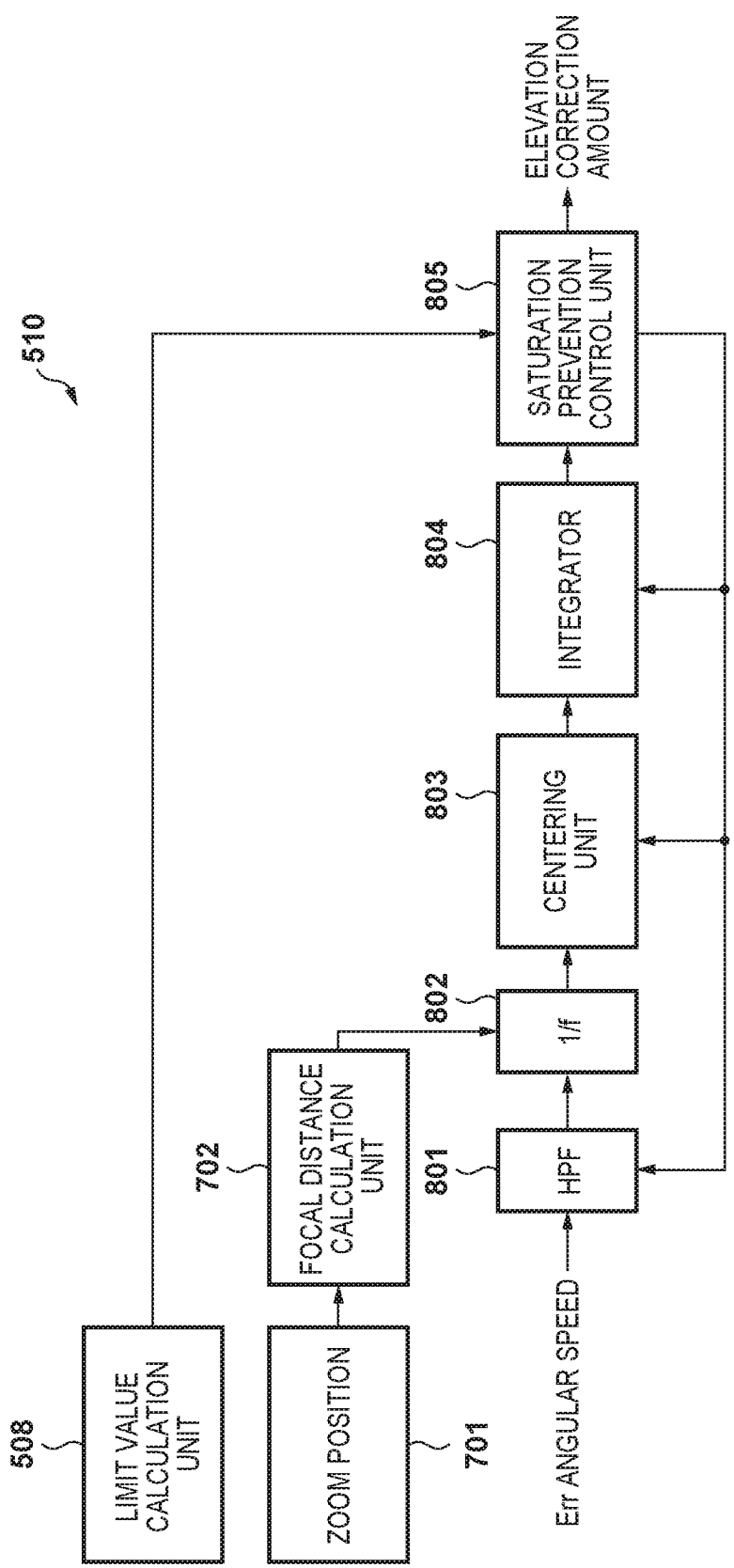
FIG. 12 is a block diagram of an elevation correction amount calculation unit in the first embodiment.

Next, a vertical elevation correction amount is calculated by a vertical elevation correction amount calculation unit 510. FIG. 12 shows the internal block configuration of the vertical elevation correction amount calculation unit 510. Operations of the internal blocks in FIG. 12 will be described. In FIG. 12, processing of blocks denoted by 801 to 805 is substantially the same as processing of blocks denoted by 703 to 707 in FIG. 11, and the only difference is that the focal distance multiplication unit 704 is replaced by a focal distance division unit 802. Therefore, the focal distance division unit 802 will be described, and description of other blocks is omitted.

The focal distance division unit 802 divides output of an HPF 801 by the focal distance f calculated by the focal distance calculation unit 702, and supplies the result to a centering unit 803. Division by the focal distance f is based on Expressions 26 and 27 for calculating elevation. Output of a saturation prevention control unit 805 is a final elevation correction amount, which is input to the image deformation amount combining unit 514.

When a vertical translation correction amount and a vertical elevation correction amount are calculated in the above-described method in step S312, the procedure advances to step S313. In step S313, a horizontal translation correction amount and a horizontal elevation correction amount are calculated from the yaw residual correction angular speed (YawErr) and the focal distance.

The horizontal translation correction amount is calculated by a horizontal translation correction amount calculation unit 511, and the horizontal elevation correction amount is calculated by a horizontal elevation correction amount calculation unit 512. Internal blocks are the same as those in FIGS. 11 and 12, and the only difference is that the residual correction angular speed YawErr in the horizontal direction is input to the blocks, and the calculation method is also the same, and thus description thereof is omitted.

Figure 13:
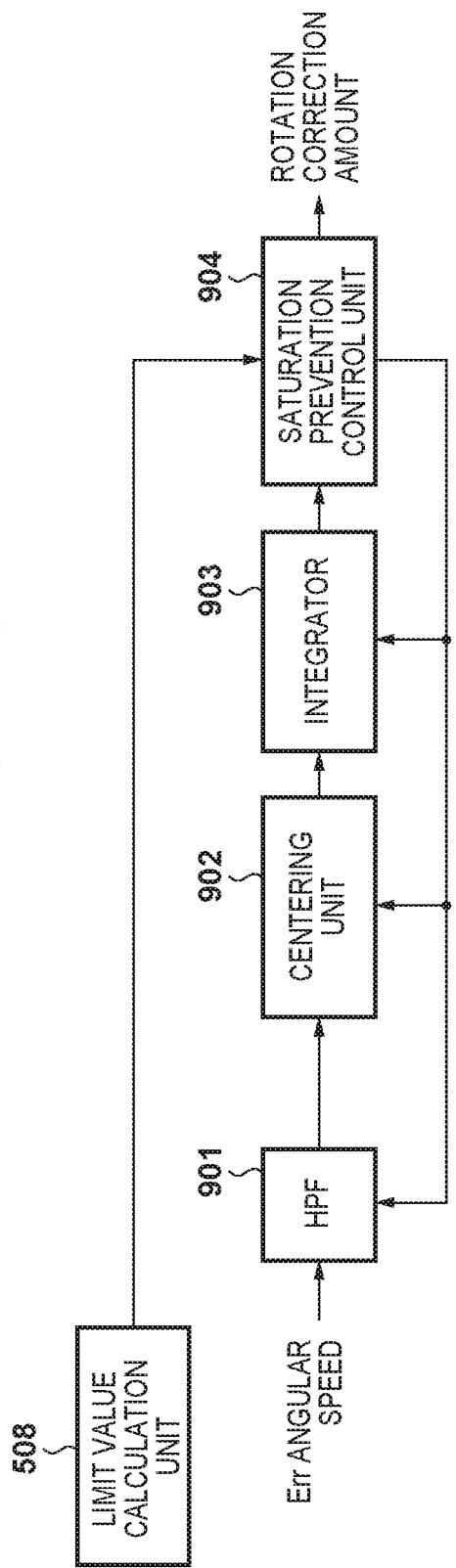
FIG. 13 is a block diagram of a rotation correction amount calculation unit in the first embodiment.

When the horizontal translation correction amount and the horizontal elevation correction amount are calculated in step S313, the procedure then advances to step S314. In step S314, a rotation correction amount is calculated from the roll residual correction angular speed (RollErr). The rotation correction amount is calculated by a rotation correction amount calculation unit 513. FIG. 13 shows the internal block configuration of the rotation correction amount calculation unit 513. Operations of the internal blocks in FIG. 13 will be described.

The Err angular speeds that are residual correction angular speeds are input to a high pass filter (hereinafter, an HPF) 901 that has a function of being able to change the characteristics at any frequency band, low-frequency components included in the angular speed data are blocked, and high-frequency-band signals are output. When angular shake that is too large to correct occurs in the roll rotation direction of the image sensor, similar to the centering units 705 and 803, a centering unit 902 performs processing for adding a centering amount to output of the HPF 901. An integrator 903 has a function of being able to change the characteristics in any frequency band, integrates output from the centering unit 902, and supplies the result to a saturation prevention control unit 904. The saturation prevention control unit 904 performs control so as to limit output from the integrator 903 such that the magnitude of output from the integrator 903 is not larger than or equal to a limit value that is output from the limit value calculation unit 508. In addition, when the magnitude of output from the integrator 903 approaches the limit value, the saturation prevention control unit 904 performs control so as to change the cutoff frequency of the HPF 901 to the high-frequency side, shorten the time constant of the integrator 903, increase the centering amount of the centering unit 902, and the like. Accordingly, the magnitude of output from the integrator 903 can be made unlikely to reach the limit value, and the following capability of image blur correction for shake can be reduced. The saturation prevention control unit 904 outputs a final rotation correction amount, which is input to the image deformation amount combining unit 514.

When rotation correction amounts are calculated in step S314, the procedure advances to step S315, where an image deformation amount is acquired by combining the correction amounts. The image deformation amount is calculated by the image deformation amount combining unit 514 combining a translation correction amount, an elevation correction amount, and a rotation correction amount. Specifically, the projection conversion matrix of Expression 2 is calculated in accordance with Expression 14. At this time, deformation amounts of enlargement/reduction and shearing take values indicated in Expression 28, Expression 29, and Expression 30. The image deformation amount combining unit 514 outputs calculated values of the elements of the projection conversion matrix to the image deformation unit 208.

In step S316, the image deformation unit 208 corrects image blur through image deformation based on output from the image deformation amount combining unit 514, and the procedure advances to step S317.

In step S317, it is determined whether or not an instruction to change the angle in the pan or tilt direction was given by the user through a manual operation on the operation unit 211. If an instruction to change the angle was given, the procedure advances to step S318, where a target angle that has been set manually is set, and the procedure advances to step S319. If it is not determined in step S317 that an instruction to change the angle was given manually, the previous value is supported as a target angle, and the procedure advances to step S319.

A manual instruction for a pan/tilt operation may be given by setting a pan/tilt target angle by operating dedicated SW provided in the camera 101. Alternatively, a configuration may be adopted in which an external device that can mutually communicate with the camera 101 is included, and a target angle is set by notifying the camera 101 of the target angle through an instruction for an operation from the external device. For example, settings may be made using a method, for example, in which buttons are provided respectively linked to pan direction right rotation, pan direction left rotation, tilt direction upward rotation, and tilt direction downward rotation, and a target angle is set according to the length of time during which a button is pressed (for example, settings are made such that a degrees are added to a target angle every time a time T elapses), or another method may be adopted.

In step S319, final target angles are calculated from the pan shake correction target angle and the tilt shake target angle respectively calculated in steps S303 and S304 and the manual target angle calculated until step S318. The final target angle that is instructed to the pan rotation unit 407 of the barrel rotational driving unit 212 is a value acquired by an adder 405 adding together output of a pan shake correction angle calculation unit 402 and a pan direction manual target angle from the operation unit 211. Also, a final target angle that is instructed to the tilt rotation unit 408 is a value acquired by an adder 406 adding output of the tilt shake correction angle calculation unit 404 and a tilt direction manual target angle from the operation unit 211.

In step S320, the target angle in the pan direction and the target angle in the tilt direction calculated in step S319 are respectively output to the pan rotation unit 407 and the tilt rotation unit 408, and thereby pan/tilt driving is performed. Accordingly, shake correction in the pan direction and shake correction in the tilt direction are performed, and an image blur correction routine is ended. This processing is performed in a predetermined sampling cycle.

As described above, in the first embodiment, the ratio of a limit value for a translational and elevational shake correction amount to a limit value for a rotating shake correction amount is changed according to the tilt angle, and extra pixels required for electronic correction are divided into translational and elevational shake correction and rotation correction according to this ratio. Accordingly, also in the case of an image capturing apparatus that has only a two-axis rotation mechanism for pan/tilt mechanical driving, or the like, by securing, for an axis about which mechanical correction cannot be performed, a large number of extra pixels for correction, the limited extra pixels can be effectively used for correcting each type of image blur, and effective image blur correction can be performed.

Second Embodiment

In the first embodiment, a method for changing correction limit values for translation, elevation, and rotation from among electronic image blur corrections based on tilt angle has been described, but a configuration may be adopted in which rolling shutter distortion correction is included. In a second embodiment, setting of limit values for the respective types of correction including rolling shutter distortion correction and a control method thereof will be described.

In recent years, in image capturing apparatuses such as digital cameras and digital video cameras, a CMOS sensor whose power consumption is lower than a CCD has often been used as an image sensor. Not only that a CCD and a CMOS sensor are different in power consumption, but also exposure methods during shooting are different. When capturing one (captured) image, exposure timings and exposure periods in all the pixels of the image sensor in a CCD are the same, while in a CMOS sensor, the shutter opening/closing timing is different for each of the lines constituting the image sensor, and thus exposure timing differs. The driving method of a CMOS sensor and the like is referred to as a rolling shutter method.

If shooting is performed using an image sensor that adopts such a rolling shutter method, there are cases where, for example, due to movement of an object that is exposed or camera shake caused by a photographer holding the image capturing apparatus during exposure, the object moves for each of the lines of the image sensor, and distortion occurs in the captured image. This phenomenon of distortion is called a "rolling shutter problem" or a "focal-plane phenomenon". In particular, distortion due to a rolling shutter problem can be exhibited more intensely in moving image shooting without a mechanical shutter than in still image shooting with a mechanical shutter.

Techniques for correcting distortion caused by camera shake caused by a photographer among distortion due to the above-described rolling shutter problem are known, and thus, in this embodiment, description of specific correction of such techniques is omitted. Note that, schematically speaking, a readout position is changed for each of the lines in order to correct distortion caused by camera shake in the horizontal direction in an image, and the position of a line to be read out is changed in the vertical direction in order to correct distortion in the vertical direction in the image.

Figure 14:
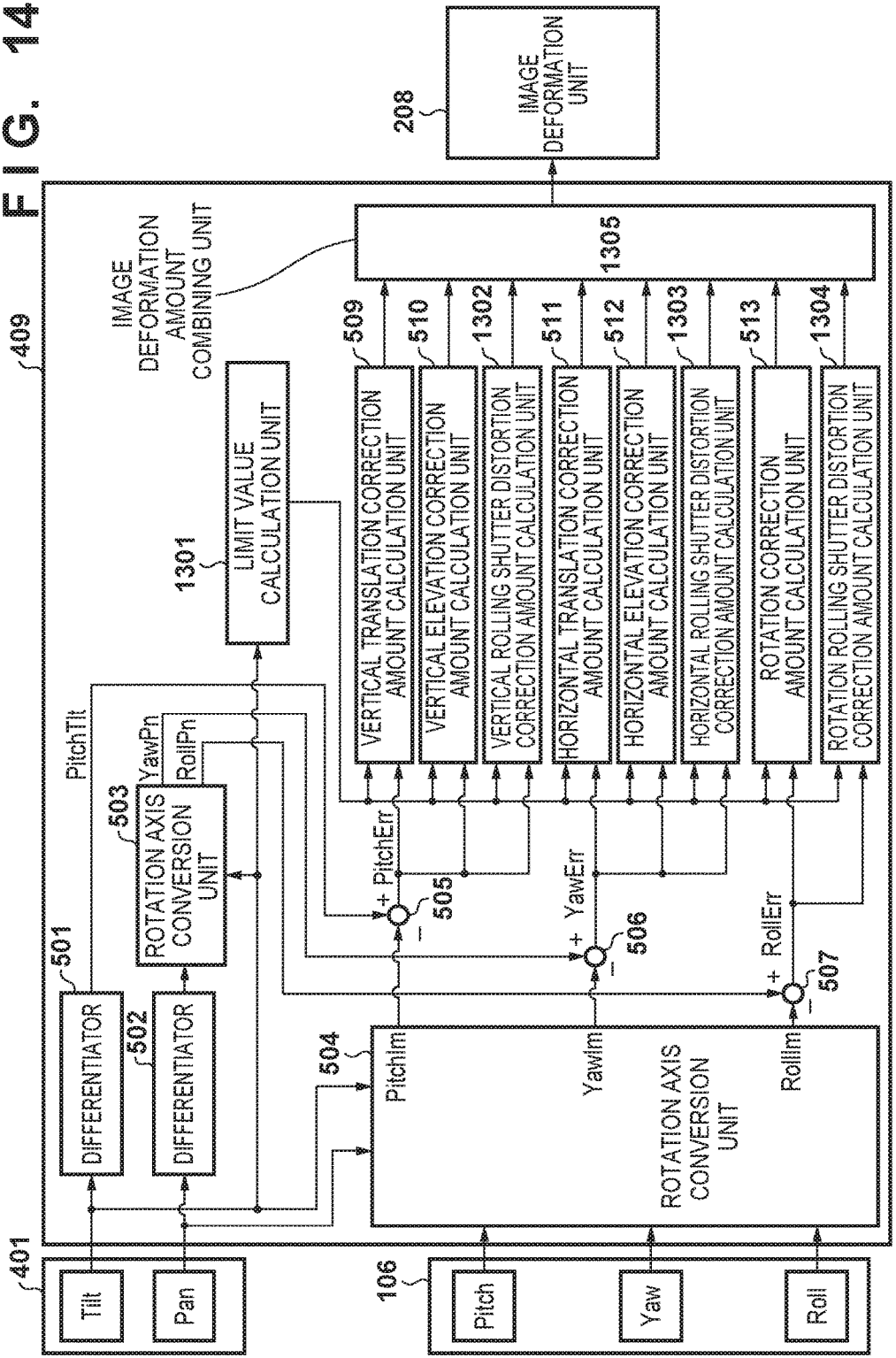
FIG. 14 is a block diagram of an image deformation amount calculation unit in a second embodiment.

Here, a method for correcting rolling shutter distortion will be described. The configuration and operations of an image deformation amount calculation unit 409 will be described with reference to a block diagram including a processing portion of rolling shutter distortion correction in FIG. 14.

The image deformation amount calculation unit 409 in this second embodiment is different from that of the block diagram of the image deformation amount calculation unit in the first embodiment shown in FIG. 8 in that:
1. a vertical rolling shutter distortion correction amount calculation unit 1302, a horizontal rolling shutter distortion correction amount calculation unit 1303, and a rotation rolling shutter distortion correction calculation unit 1304 are added, and output of these calculation units is input to an image deformation amount combining unit 1305,
2. the limit value calculation unit 508 is replaced by a limit value calculation unit 1301 in order to calculate a limit value for correcting rolling shutter distortion, and
3. the image deformation amount combining unit 514 is replaced by an image deformation amount combining unit 1305 including input of rolling shutter distortion correction.

A movement amount of an image-forming position caused according to each rolling shutter distortion and reference range information are calculated from residual correction angular speeds (PitchErr, YawErr, and RollErr). Specifically, it is calculated which pixel position in a memory to which of each pixel positions corrected for rolling shutter distortion, and formed into an image corresponds, using a residual correction vibration amount, and the difference of those coordinate positions is calculated as a movement amount. In addition, the reference range information is information for correcting rolling shutter distortion. In this manner, a rolling shutter distortion correction amount calculation unit calculates range information indicating a range in a memory used for correcting rolling shutter distortion that occurred in image capture using a rolling shutter method and a movement amount, and performs rolling shutter distortion correction.

Similar to the method described in the first embodiment, the limit value calculation unit 1301 calculates a limit value for a vertical and horizontal rolling shutter distortion correction amount and a limit value for a rotation rolling shutter distortion correction amount, according to a tilt angle.

Similar to the method described with reference to FIG. 10B, limit values are calculated. Here, letting the ratio of the vertical and horizontal rolling shutter distortion correction amount be Ay, and the ratio of the rotation rolling shutter distortion correction amount be Ar, limit values are obtained. Values acquired by dividing a range for correcting rolling shutter distortion prepared in advance according to the ratio of Ay and Ar are set as limit values for the respective types of rolling shutter distortion correction, and thereby an appropriate correction amount for each shake can be secured according to a tilt angle.

Figure 15:
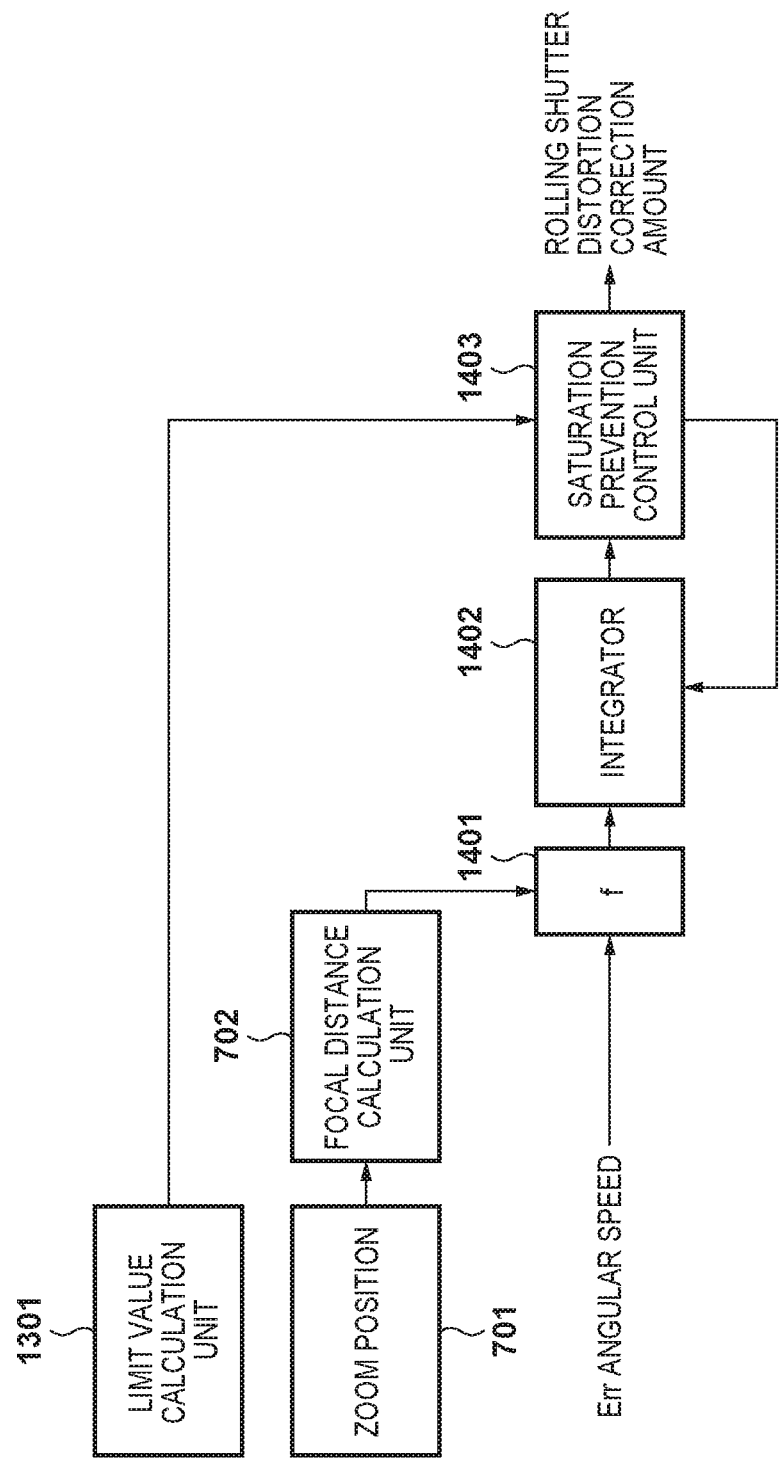
FIG. 15 is a block diagram of a rolling shutter distortion correction amount calculation unit of the second embodiment.

A method for calculating rolling shutter distortion correction amounts by the vertical rolling shutter distortion correction amount calculation unit 1302 and the horizontal rolling shutter distortion correction amount calculation unit 1303 will be described with reference to FIG. 15. Whether the distortion is vertical or horizontal is only whether an input signal indicates a PitchErr angular speed or a YawErr angular speed, and internal calculation is performed using a similar method. The pitch residual correction angular speed (PitchErr) and a vertical rolling shutter distortion correction limit value from the limit value calculation unit 1301 are input to the vertical rolling shutter distortion correction amount calculation unit 1302. In addition, a yaw residual correction angular speed (YawErr) and a horizontal rolling shutter distortion correction limit value from the limit value calculation unit 1301 are input to the horizontal rolling shutter distortion correction amount calculation unit 1303.

Err angular speeds that are residual correction angular speeds are input to a focal distance multiplication unit 1401. The focal distance calculation unit 702 calculates a focal distance of the imaging optical system from output of encoders of a zoom unit 201, and sets the focal distance to be used for calculation that is performed by the focal distance multiplication unit 1401. The focal distance multiplication unit 1401 multiplies the Err angular speeds by a focal distance f calculated by the focal distance calculation unit 702, and supplies the result to an integrator 1402. The integrator 1402 has a function of being able to change the characteristics at any frequency band, integrates output from the focal distance multiplication unit 1401, and supplies the result to a saturation prevention control unit 1403. Here, the integrator 1402 is initialized to 0 when the image sensor starts exposure, and calculates a shake amount during an exposure period. The limit value calculation unit 1301 calculates limit values in accordance with the tilt angle position as described above, and inputs the values to the saturation prevention control unit 1403.

The saturation prevention control unit 1403 clamps output from the integrator 1402 using the limit values such that the output from the integrator 1402 is not larger than or equal to the limit values that are output from the limit value calculation unit 1301. Here, in the case where, as in FIG. 2C, the tilt angle, namely the optical axis direction of the barrel matches the Y axis, namely, the yaw rotation axis in FIG. 2B, image blur correction in a rotation direction on the imaging plane can be performed by driving the pan rotation unit 105. However, image blur correction in the horizontal direction on the imaging plane cannot be performed, and thus it is desired to increase a rolling shutter distortion correction effect in the horizontal direction. In this case, parameters are set such that the limit values calculated by the limit value calculation unit 1301 increase. In addition, as shown in FIG. 2A, in the case where the optical axis direction of the barrel matches the Z axis, namely the roll rotation axis as in FIG. 2B, image blur correction in the horizontal direction on the imaging plane is possible by driving the pan rotation unit 105. Therefore, parameters are set such that a rolling shutter distortion correction effect in the horizontal direction decreases.

The saturation prevention control unit 1403 performs control so as to limit the magnitude of output from of the integrator 1402. If the time constant of the integrator 1402 is increased, a control band of rolling shutter distortion correction is extended, and if the time constant is decreased, the control band is reduced, and low-frequency control is weakened. Here, a case is considered in which a correction range of rolling shutter distortion correction is small, but vibration is large, and large rolling shutter distortion occurs. In this case, integrated signals soon reach the limit values, and there is a possibility that rolling shutter distortion correction is effective only for a line portion of the former half of exposure and rolling shutter distortion correction is not effective at all in a line portion of the latter half of the exposure. In view of this, under a condition where limit values decrease, the time constant of the integrator is set to be small such that a certain amount of correctable angle can be secured as an overall correction effect, although a correction effect for each correction line decreases. In addition, under a condition where limit values are large, the time constant of the integrator is set to be large, such that the rolling shutter distortion correction effect is strengthened.

According to the above-described method, the magnitude of output from the integrator 1402 can be made unlikely to reach limit values, and it is possible to calculate a final rolling shutter distortion correction amount suitable for a correction region that has been set by the limit value calculation unit 1301. The calculated rolling shutter distortion correction amount is then input to the image deformation amount combining unit 1305, and is converted into units equivalent to a blur amount on the imaging plane, and correction amounts are determined in correspondence with readout timings.

Figure 16:
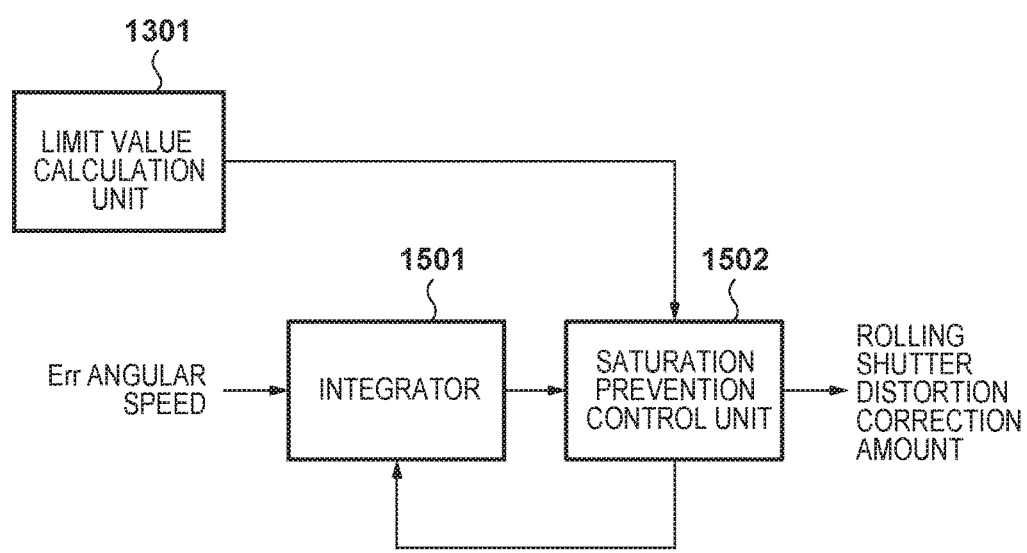
FIG. 16 is a block diagram of a rotation rolling shutter distortion correction amount calculation unit in the second embodiment.

Next, a method for calculating a rolling shutter distortion correction amount in the rotation rolling shutter distortion correction amount calculation unit 1304 will be described with reference to FIG. 16.

Err angular speeds that are residual correction angular speeds are input to an integrator 1501. The integrator 1501 has a function of being able to change the characteristics at any frequency band, integrates the Err angular speed, and supplies the result to a saturation prevention control unit 1502. Here, the integrator 1501 is initialized to 0 when exposure of the image sensor starts, and calculates a shake amount during the exposure period. As described above, the limit value calculation unit 1301 calculates limit values according to a tilt angle position, and inputs the calculated limit values to the saturation prevention control unit 1502.

The saturation prevention control unit 1502 clamps output from the integrator 1501 using the limit values such that the output from the integrator 1501 is not larger than or equal to the limit values that are output from the limit value calculation unit 1301. Here, in the case where, as in FIG. 2A, the tilt angle, namely, the optical axis direction of the barrel matches the Z axis, namely the roll rotation axis in FIG. 2B, image blur correction in the horizontal direction on the imaging plane is possible by driving the pan rotation unit. However, image blur correction in a rotation direction on the imaging plane cannot be performed, and thus it is desirable to increase a rolling shutter distortion correction effect in the rotation direction. In this case, parameters are set such that limit values that are calculated by the limit value calculation unit 1301 increase. In addition, in the case where, as in FIG. 2C, the optical axis direction of the barrel matches the Y axis, namely the yaw rotation axis in FIG. 2B, image blur correction in a rotation direction on the imaging plane is possible by driving the pan rotation unit 105. Therefore, parameters are set such that a rolling shutter distortion correction effect in the rotation direction decreases.

In addition, as described with reference to FIG. 15, by changing the time constant of the integrator according to limit values, the magnitude of output from the integrator 1501 can be made unlikely to reach the limit values. Therefore, it is possible to calculate a final rotation rolling shutter distortion correction amount suitable for a correction region that has been set by the limit value calculation unit 1301. The calculated rotation rolling shutter distortion correction amount is then input to the image deformation amount combining unit 1305, is converted into units equivalent to a blur amount on the imaging plane, and correction amounts are determined in correspondence with readout timings.

As described above, in the second embodiment of the present invention, the ratio of a limit value for a translational and elevational shake correction amount and a limit value for a rotating shake correction amount, and, in addition, a limit value for horizontal or vertical rolling shutter distortion correction and a limit value for rotation rolling shutter distortion correction is changed according to the tilt angle. Extra pixels required for correction are then divided into the translational and elevational shake correction amount, the rotation correction amount, the horizontal or vertical rolling shutter distortion correction amount, and the rotation rolling shutter distortion correction amount, according to the ratio. Accordingly, even in the case of an image capturing apparatus that only has a two-axis rotation mechanism such as pan/tilt mechanical driving, a large number of extra pixels for correction can be secured for an axis about which mechanical correction cannot be performed. Accordingly, the limited extra pixels can be effectively used for correcting each image blur, and effective image blur correction can be performed.

Third Embodiment

In the first and second embodiments, an operation of changing correction limit values for translation, elevation, rotation, rolling shutter distortion and the like in electronic correction according to a tilt angle has been described.

However, regarding an axis about which mechanical correction cannot be performed, if an amount of shake about the same axis is small, it is not necessary to set a limit value for an electronic correction amount about this axis to be large. In the third embodiment, a method for setting electronic correction limit values according to the magnitude of shake amounts about axes relative to the imaging plane, in addition to a tilt angle, will be described.

Figure 17:
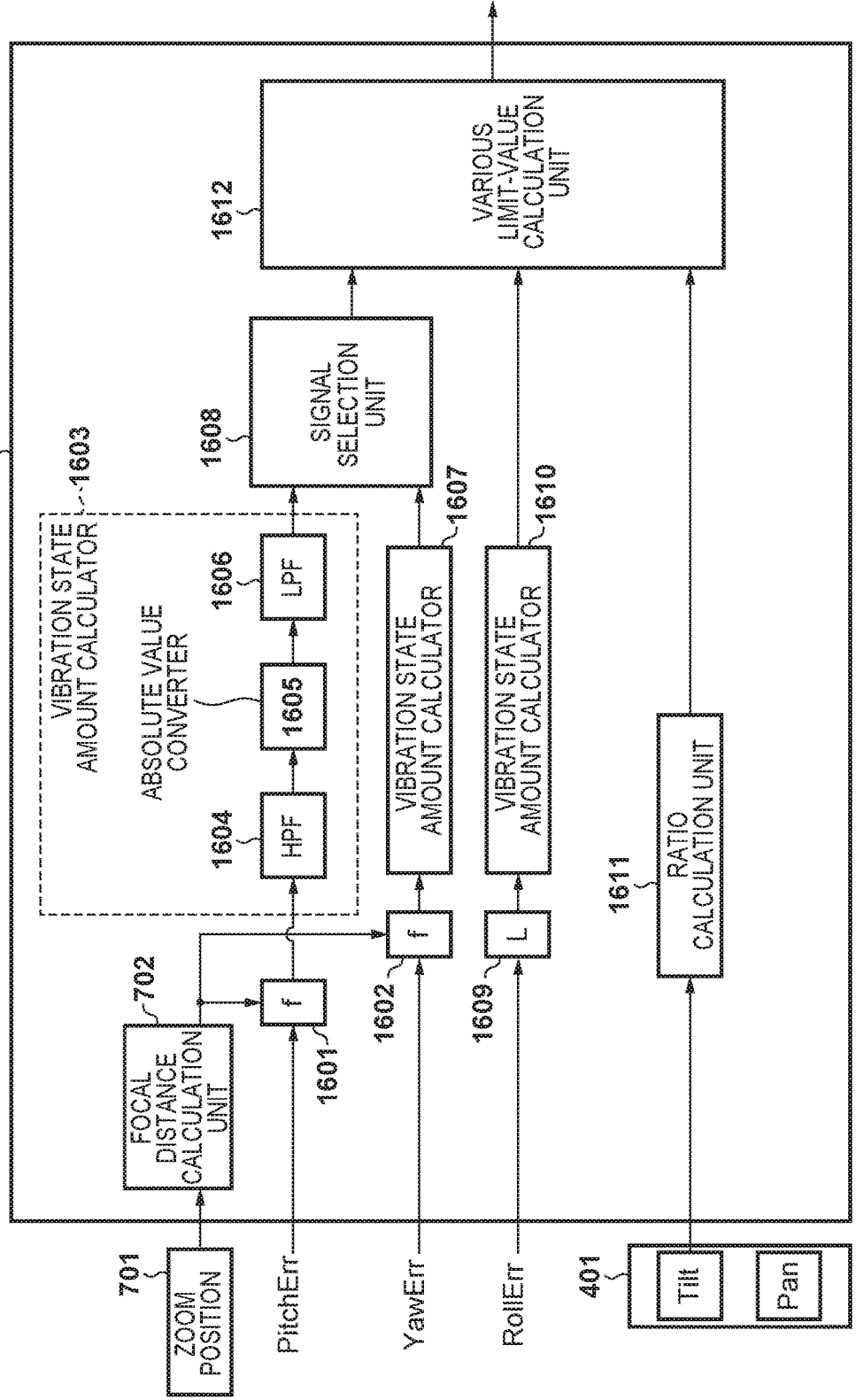
FIG. 17 is a block diagram of an image deformation amount calculation unit in a third embodiment.

FIG. 17 is a diagram for explaining a method for calculating limit values in the limit value calculation unit 508 in the block diagram in FIG. 8 of the first embodiment. In addition to a tilt angle, mechanical residual correction angular speeds (PitchErr, YawErr, and RollErr) that are outputs of the subtractors 505, 506, and 507 are newly input to the limit value calculation unit 508.

First, the focal distance calculation unit 702 calculates a focal distance of an imaging optical system from output of encoders of the zoom unit 201, and sets the focal distance to be used for calculation that is performed by focal distance multiplication units 1601 and 1602.

A pitch residual correction angular speed (PitchErr) is input to the focal distance multiplication unit 1601, is multiplied by a focal distance f calculated by the focal distance calculation unit 702, and is input to a vibration state amount calculator 1603. Here, internal calculation of the vibration state amount calculator 1603 will be described. First, output of the focal distance multiplication unit 1601 is input to an HPF 1604, and after low-frequency components are removed, is input to an absolute value converter 1605. The absolute value of an output value from the HPF 1604 is then calculated, and is input to an LPF 1606. The LPF 1606 shuts off high-frequency components that exceed a cutoff frequency that has been set, from among signal frequency components of the angular speed absolute value that has been output from the absolute value converter 1605, and outputs low-frequency components that are lower than or equal to the cutoff frequency, and thereby calculates a vibration state amount in the PitchErr direction. The vibration state amount corresponding to the calculated pitch correction vibration residual angular speed is input to a signal selection unit 1608.

At the same time, a yaw residual correction angular speed (YawErr) is input to the focal distance multiplication unit 1602, is multiplied by the focal distance f calculated by the focal distance calculation unit 702, and is input to a vibration state amount calculator 1607. After that, using a method similar to that of the vibration state amount calculator 1603, a vibration state amount corresponding to a yaw correction residual vibration angular speed is calculated, and is input to the signal selection unit 1608. In the signal selection unit 1608, output of the vibration state amount calculator 1603 in the pitch direction is compared with output of the vibration state amount calculator 1607 in the yaw direction, and a signal of the larger output value is input to each various-limit-value calculation unit 1612.

At the same time, a roll residual correction angular speed (RollErr) is input to a multiplier 1609, and is multiplied by a predetermined coefficient L. A vibration state amount calculator 1610 then calculates a vibration state amount corresponding to the roll correction residual vibration angular speed using a method similar to that of the vibration state amount calculator 1603, and inputs the calculated vibration state amount to the various-limit-value calculation unit 1612. A predetermined distance from the imaging center (when the distance from the center of the imaging plane to a corner of the light receiving region of the sensor is 100%, at a position that corresponds to 80% of this distance, for example) is set as the value L used for multiplication performed by the multiplier 1609.

In addition, the current tilt angular position from the pan/tilt position 401 is input to a ratio calculation unit 1611, and Ky and Kr in FIGS. 10A and 10B are calculated based on the tilt angle using the method described with reference to FIGS. 10A and 10B of the first embodiment, and are input to the various-limit-value calculation unit 1612.

Here, letting output of the signal selection unit 1608 be PYErr, output of the vibration state amount calculator 1610 be RErr, and the value of the total region of electronic correction be FlLimit, a translation correction limit value+ an elevation correction limit value PYLimit. and a rotation correction limit value RLimit are calculated with Expression 42 and Expression 43.

$$PYLimit = \frac{Ky \times PYErr}{Ky \times PYErr + Kr \times RErr} \times FlLimit \quad (42)$$

$$RLimit = \frac{Ky \times RErr}{Ky \times PYErr + Kr \times PErr} \times FlLimit \quad (43)$$

The value FlLimit of the total region of electronic correction that has been set in advance is divided into a translation correction limit value, an elevation correction limit value, and a rotation correction limit value from a tilt angle and the vibration state amounts from the mechanical residual correction angular speeds (PitchErr, YawErr, and RollErr) using the above-described method.

As described above, a translation correction limit value, an elevation correction limit value, and a rotation correction limit value are calculated based on the residual vibration amounts for the axes on the imaging plane and the tilt angle. Accordingly, even in the case of an image capturing apparatus that only has a two-axis rotation mechanism such as pan/tilt mechanical driving, limited extra pixels can be effectively used for correcting each image blur, and effective image blur correction can be performed.

Fourth Embodiment

In the first to third embodiments, image blur correction has been described in which a mechanism for rotating a barrel about two axes is combined with electronic shake correction. However, in a fourth embodiment, a method for correcting image blur by rotating and shifting an image sensor, in which using optical axis shift correction and imaging rotation is used, will be described.

Figure 18:
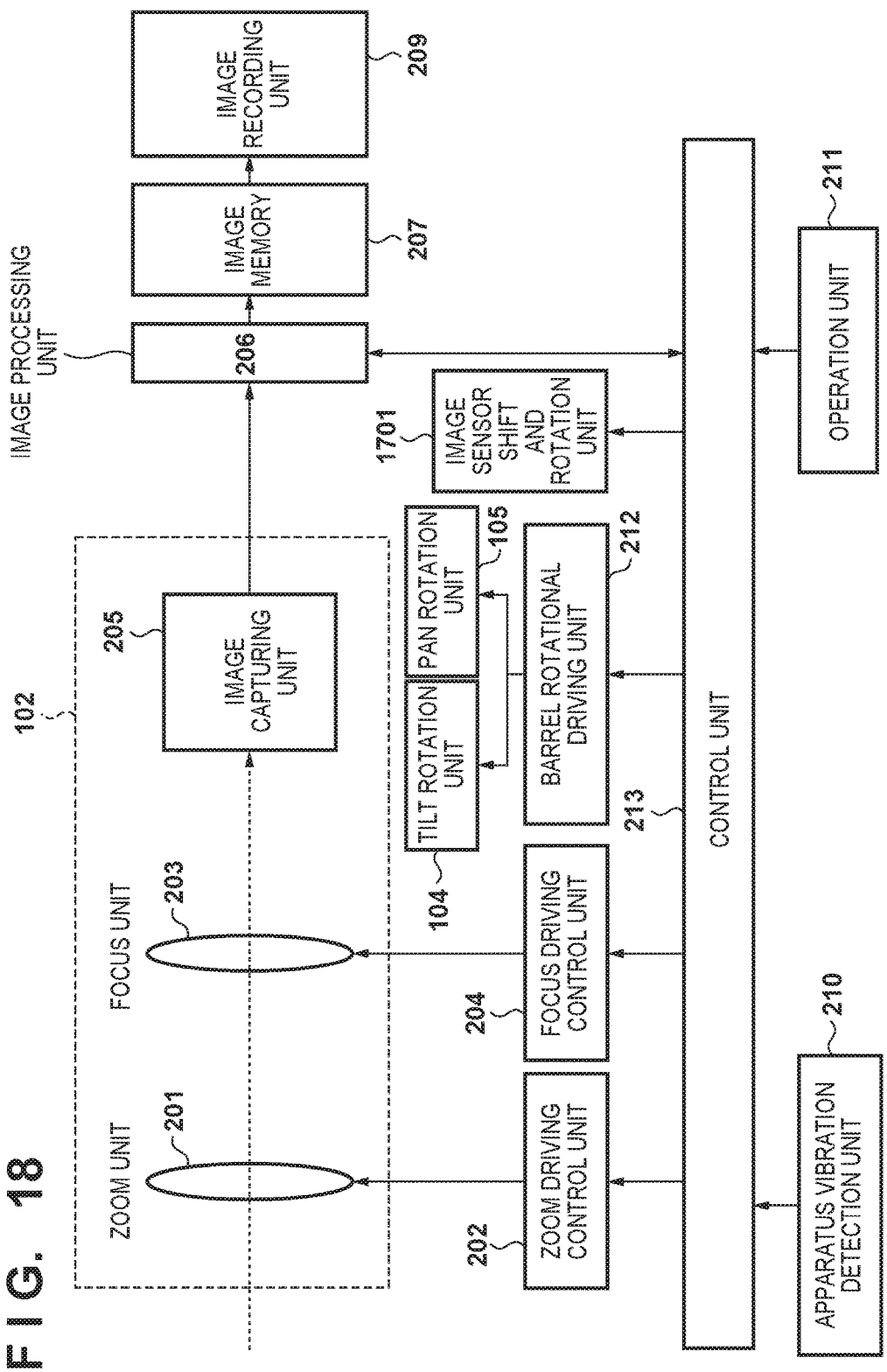
FIG. 18 is a diagram showing a configuration of an image capturing apparatus in a fourth embodiment.

FIG. 18 is a block diagram showing the configuration of an image capturing apparatus in the fourth embodiment. The differences from the block diagram in FIG. 3 is that the image deformation unit 208 is removed, and an image sensor shift and rotation unit 1701 is added instead.

The image sensor shift and rotation unit 1701 has a mechanism that can shift and rotationally move an image sensor in the horizontal or vertical direction. However, similar to electronic correction of translation and rotation described in the first embodiment, a correctable range is limited. A correction ratio of shift and rotation in the fourth embodiment is also calculated using a method similar to the method described in the first embodiment. Accordingly, even in the case of an image capturing apparatus that has only a two-axis rotation mechanism such as a pan/tilt mechanical driving, effective image blur correction can be performed by performing appropriate correction restriction on correction by shifting and rotating the image sensor.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment (s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment (s) and/or controlling the one or more circuits to perform the functions of one or more of the above-described embodiment (s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-090238, filed Apr. 28, 2017 which is hereby incorporated by reference herein in its entirety.

What is claimed is:

1. An image stabilization apparatus comprising:
at least one processor and/or circuitry;
a supporting device configured to support an image capturing device configured to capture an object image formed by an imaging optical system;
a rotation device configured to rotate the supporting device in two axis directions;
a calculation unit configured to calculate a residual correction amount of image blur after age blur correction is performed by a first image blur correction device configured to correct image blur on an imaging plane of the image capturing device caused by shake of the apparatus by driving the rotation device, based on output of a shake detection device configured to detect shake of the apparatus and a moving amount of the first image blur correction device;
a second image blur correction device configured to correct the residual on amount of image blur using a method different from that of the first image blur correction device; and
a change unit configured to change allocation between a correctable range of the second image blur correction device correcting image blur in a horizontal or vertical direction on the imaging plane of the image capturing device and a correctable range of the second image blur correction device correcting image blur in a rotation direction on the imaging plane, based on a rotation angle of the rotation device and the residual correction amount of image blur,
wherein the calculation unit and the change unit are implemented by the at least one processor or the circuitry or a combination thereof.

2. The image stabilization apparatus according to claim 1, wherein a correction amount of image blur in the horizontal or vertical direction on the imaging plane includes at least one of a correction amount for correcting image blur n a translation direction of an object image, a correction amount for correcting an elevation component, and a correction amount for correcting vertical or horizontal rolling shutter distortion.

3. The image stabilization apparatus according to claim 1, wherein a correction amount of image blur in the rotation direction on the imaging plane includes at least one of a correction amount of image blur in the rotation direction of the object image and a correction amount for correcting rotation rolling shutter distortion.

4. The image stabilization apparatus according to claim 1, wherein the second image blur correction device electronically corrects image blur by performing image processing on image signals from the image capturing device.

5. The image stabilization apparatus according to claim 4, wherein the second image blur correction device mainly corrects shake about an axis other than two axes about which the rotation device can rotate.

6. The image stabilization apparatus according, to claim 1, wherein the second image blur correction device corrects image blur by moving the image capturing device.

7. The image stabilization apparatus according to claim 6, wherein the second image blur correction device mainly corrects shake about an axis other than two axes about which the rotation device can rotate.

8. The image stabilization apparatus according to claim 1, wherein the change unit calculates a magnitude of an image blur amount on the imaging plane based on output of the shake detection device and a rotation angle of the rotation device, and changes allocation between a correctable range of image blur in the horizontal or vertical direction on the imaging plane and a correctable range of it image blur in the rotation direction on the imaging plane, based on the rotation angle of the rotation device and the magnitude of the image blur amount on the imaging plane.

9. The image stabilization apparatus according to claim 1, wherein the shake detection device is installed in a main body device configured to support the rotation devices and the least one processor and/or circuitry further function as a conversion unit configured to convert output of the shake detection device into shake of the supporting device, based on a rotation angle of the rotation device.

10. The image stabilization apparatus according to claim 1, wherein the at least one processor and/or circuit further function as:
a focal distance detection unit configured to detect information regarding a fecal distance of the imaging optical system,
wherein the change unit changes allocation between a correctable range of image blur in the horizontal or vertical direction on the imaging plane of the image capturing unit and a correctable range of image blur in the rotation direction on the imaging plane, based on a magnitude of the focal distance of the imaging optical system.

11. A control method of an image stabilization apparatus that includes a supporting device that supports an image capturing device that captures an object image formed by an imaging optical system, and a rotation device that rotates the supporting device in two axis directions, said method comprising:

calculating a residual correction amount of image blur after mage blur correction is performed by a first image blur correction device that corrects image blur on an imaging plane of the image capturing device caused by shake of the apparatus by driving the rotation device, based on output of a shake detection device that detects shake of the apparatus and a moving amount of the first image blur correction device;

correcting the residual correction amount of image blur, by a second image blur correction device that corrects the residual correction amount of image blur using a method different from that of the first image blur correction unit device; and changing allocation between a correctable range of the second image blur correction device correcting image blur in a horizontal or vertical direction on the aging plane of the image capturing device and a correctable range of the second image blur correction device correcting image blur in a rotation, direction on the imaging plane, based on a rotation angle of the rotation device and the residual correction amount oaf image blur.

12. A non-transitory computer-readable storage medium that stores a program for causing a computer to execute steps of a control method of an image stabilization apparatus that includes a supporting device that supports an image capturing device that captures an object image formed by an aging optical system, and a rotation device that rotates the supporting device in two axis directions, said method comprising:

calculating a residual correction amount of image blur after image blur correction is performed by a first image blur correction device that corrects age blur on an imaging plane of the image capturing device caused by shake of the apparatus by driving the rotation device, based on output of a shake detection device that detects shake of the apparatus aid a moving amount of the first image blur correction device;

correcting the residual correction amount of image blur, by a second image blur correction device that corrects the residual correction amount of image blur using a method different from that of the first image blur correction device; and changing allocation between a correctable range of the second image blur correction device correcting image blur in a horizontal or vertical direction on the imaging plane of the image capturing device and a correctable range of the second image blur correction device correcting image blur n a rotation direction on the aging plane, based on a rotation angle of the rotation device and the residual correction amount of it age blur.

* * * * *